United States Patent
Diamond et al.

(10) Patent No.: US 10,784,567 B2
(45) Date of Patent: Sep. 22, 2020

(54) METHODS AND SYSTEMS FOR MITIGATING INTERFERENCE WITH A NEARBY SATELLITE

(71) Applicant: VIASAT, INC., Carlsbad, CA (US)

(72) Inventors: Lance B Diamond, Johns Creek, GA (US); Donald L Runyon, Duluth, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 16/163,808

(22) Filed: Oct. 18, 2018

(65) Prior Publication Data

US 2019/0044221 A1 Feb. 7, 2019

Related U.S. Application Data

(63) Continuation of application No. 15/165,539, filed on May 26, 2016, now Pat. No. 10,135,126.
(Continued)

(51) Int. Cl.
*H01Q 1/28* (2006.01)
*H01Q 3/24* (2006.01)
(Continued)

(52) U.S. Cl.
CPC .............. *H01Q 1/28* (2013.01); *H01Q 1/42* (2013.01); *H01Q 3/02* (2013.01); *H01Q 3/08* (2013.01);
(Continued)

(58) Field of Classification Search
CPC ........... H01Q 1/28; H01Q 1/42; H01Q 21/28; H01Q 21/06; H01Q 3/02; H01Q 3/08;
(Continued)

(56) References Cited

U.S. PATENT DOCUMENTS

| 6,751,801 | B1 | 6/2004 | Frisco et al. |
| 7,136,621 | B2 * | 11/2006 | de La Chapelle ........... H04B 7/18506 455/13.2 |

(Continued)

OTHER PUBLICATIONS iGT, "Airborne Satellite COTM", www.iDirectGT.com, Sep. 2012, 9 pgs.
(Continued)

*Primary Examiner* — Hoang V Nguyen
*Assistant Examiner* — Awat M Salih
(74) *Attorney, Agent, or Firm* — Holland & Hart LLP

(57) ABSTRACT

In one embodiment, an antenna system is described. The antenna system includes a primary antenna on an aircraft. The primary antenna is mechanically steerable and has an asymmetric antenna beam pattern with a narrow beamwidth axis and a wide beamwidth axis at boresight. The antenna system also includes a secondary antenna on the aircraft, the secondary antenna including an array of antenna elements. The antenna system also includes an antenna selection system to control communication of a signal between the aircraft and a target satellite via the primary antenna and the secondary antenna. The antenna selection system switches communication of the signal from the primary antenna to the secondary antenna when an amount of interference with an adjacent satellite reaches a threshold due to the wide beamwidth axis of the asymmetric antenna beam pattern.

20 Claims, 13 Drawing Sheets

Related U.S. Application Data

(60) Provisional application No. 62/171,418, filed on Jun. 5, 2015.

(51) Int. Cl.

| | | |
|---|---|---|
| *H01Q 3/08* | (2006.01) | |
| *H01Q 21/06* | (2006.01) | |
| *H04B 7/06* | (2006.01) | |
| *H01Q 1/42* | (2006.01) | |
| *H01Q 3/02* | (2006.01) | |
| *H01Q 21/28* | (2006.01) | |
| *H04B 7/08* | (2006.01) | |
| *H04B 7/185* | (2006.01) | |
| *H04B 7/195* | (2006.01) | |

(52) U.S. Cl.
CPC ............... *H01Q 3/24* (2013.01); *H01Q 21/06* (2013.01); *H01Q 21/28* (2013.01); *H04B 7/0608* (2013.01); *H04B 7/0814* (2013.01); *H04B 7/1851* (2013.01); *H04B 7/18508* (2013.01); *H04B 7/195* (2013.01)

(58) Field of Classification Search
CPC ........ H01Q 3/24; H04B 7/1851; H04B 7/195; H04B 7/18508; H04B 7/0814; H04B 7/0608
See application file for complete search history.

(56) References Cited

U.S. PATENT DOCUMENTS

| | | | |
|---|---|---|---|
| 7,408,898 B1 | 8/2008 | Brown | |
| 7,629,935 B2 | 12/2009 | Mansour et al. | |
| 7,630,683 B2 | 12/2009 | De La Chapelle | |
| 7,768,469 B2 | 8/2010 | Mansour et al. | |
| 7,999,750 B2 | 8/2011 | Mansour et al. | |
| 8,737,925 B2 | 5/2014 | Beeler et al. | |
| 9,647,748 B1* | 5/2017 | Mitchell | H04B 7/18508 |
| 10,135,126 B2 | 11/2018 | Diamond et al. | |
| 2002/0058478 A1* | 5/2002 | de La Chapelle | H04B 7/18506 455/13.4 |
| 2005/0085186 A1 | 4/2005 | Sandrin | |
| 2009/0022088 A1 | 1/2009 | Wahlberg et al. | |
| 2011/0215985 A1 | 9/2011 | Kaplan et al. | |
| 2012/0200458 A1 | 8/2012 | Jalali et al. | |
| 2013/0044611 A1* | 2/2013 | Jalali | H04B 7/18508 370/252 |
| 2014/0145887 A1* | 5/2014 | Irvine | H01Q 3/30 343/713 |
| 2014/0225767 A1* | 8/2014 | Cordone | H04B 7/18508 342/352 |
| 2014/0225768 A1* | 8/2014 | Engel | H01Q 3/08 342/354 |
| 2017/0358851 A1 | 12/2017 | Diamond et al. | |

OTHER PUBLICATIONS

Shroyer, "Satcom-On-The-Move Why One Size Doesn't Fit All", General Dynamics SATCOM Technologies, Military Communications Conference MILCOM, 2012, 6 pgs.

White Paper, "Adjusting Equivalent Isotropic Radiated Power per Bandwidth as a Function of SKEW Angle for ARINC 791 Antenna Systems", Oct. 24, 2011, 16 pgs.

\* cited by examiner

METHODS AND SYSTEMS FOR MITIGATING INTERFERENCE WITH A NEARBY SATELLITE

CROSS-REFERENCE TO RELATED APPLICATIONS

This application is a continuation of U.S. Non-Provisional application Ser. No. 15/165,539, titled "Methods and Systems for Mitigating Interference with a Nearby Satellite", filed 26 May 2016, which claims priority to U.S. Provisional Application No. 62/171,418, titled "Methods and Systems for Mitigating Interference with a Nearby Satellite", filed 5 Jun. 2015, each of which are incorporated by reference herein.

BACKGROUND

The present disclosure relates generally to satellite communications, and more specifically to airborne systems and methods for using such systems to avoid excessive interference with one or more non-target satellites during communication with a target satellite.

A geostationary satellite is a satellite that is in geostationary Earth orbit (GEO) about 35,800 km above Earth's equator, and has a revolution around the Earth synchronized with Earth's rotation. As a result, the geostationary satellite appears stationary to an observer on the Earth's surface.

Geostationary satellites occupy orbital slots separated in longitude along the geostationary arc above the Earth's equator. These geostationary satellites, which operate using various frequencies and polarizations, provide a variety of broadcast and communication services. Other types of satellites include low Earth orbit (LEO) satellites set between about 160 km and 2,000 km above Earth's surface, and medium Earth orbit (MEO) satellites set in orbit with an altitude greater than about 2,000 km and less than about 35,800 km above Earth's surface.

An Earth-based antenna terminal for communication with a satellite typically has high antenna gain and a narrow main beam pointed at the satellite, because of the large distance to the satellite and to avoid interference with other satellites. In order to satisfy interference requirements with the other satellites, a mobile antenna terminal may only be permitted to communicate with the target satellite when at certain geographic locations. In such a case, services provided by the satellite are unavailable to users of the mobile antenna terminal while at these locations, even though they are within the coverage area of the satellite.

SUMMARY

In one embodiment, an antenna system for mounting on an aircraft is described. The antenna system includes a primary antenna on the aircraft. The primary antenna is mechanically steerable and has an asymmetric antenna beam pattern with a narrow beamwidth axis and a wide beamwidth axis at boresight. The antenna system also includes a secondary antenna on the aircraft. The secondary antenna includes an array of antenna elements. The antenna system also includes an antenna selection system to control communication of a signal between the aircraft and a target satellite via the primary antenna and the secondary antenna. The antenna selection system switches communication of the signal from the primary antenna to the secondary antenna when an amount of interference with a non-target satellite reaches a threshold due to the wide beamwidth axis of the asymmetric antenna beam pattern.

In another embodiment, a method is described that includes communicating a signal between a target satellite and an aircraft via a primary antenna on the aircraft. The primary antenna is mechanically steerable and has an asymmetric antenna beam pattern with a narrow beamwidth axis and a wide beamwidth axis at boresight. The method also includes determining that an amount of interference with a non-target satellite reaches a threshold due to the wide beamwidth axis of the asymmetric antenna beam pattern. The method also includes, in response to the determination, switching communication of the signal from the primary antenna to a secondary antenna on the aircraft to reduce interference with the non-target satellite. The secondary antenna includes an array of antenna elements.

In yet another embodiment, an antenna system for mounting on an aircraft for communication with a target satellite is described. The antenna system includes a primary antenna comprising a first array of antenna elements and a positioner. The first array of antenna elements has a first main beam with a horizontal half-power beamwidth along a horizontal axis of the first array and has a vertical half-power beamwidth along a vertical axis of the first array. The vertical half-power beamwidth is greater than the horizontal half power beamwidth. The positioner is rotatably coupled with the first array about at least a first axis and a second axis to point the first main beam at the target satellite. The first main beam has a composite half power beamwidth that is less than or equal to a particular value over a first range of skew angles. The first main beam has a composite half power beamwidth that is greater than the particular value over a second range of skew angles. The antenna system also includes a secondary antenna oriented relative to the primary antenna. The secondary antenna includes a second array of antenna elements having a second main beam and a steering mechanism to point the second main beam at the target satellite. The second main beam has a composite half power beamwidth that is less than or equal to the particular value over the second range of skew angles. The antenna system also includes an antenna selection system to select between the primary antenna and the secondary antenna for communication of a signal with the target satellite based on the skew angle.

In yet another embodiment, an antenna system for mounting on an aircraft is described. The antenna system includes a primary antenna on the aircraft. The primary antenna has a first acceptable service area for communication of a signal between the aircraft and a target satellite while satisfying an interference requirement with a non-target satellite. The antenna system also includes a secondary antenna on the aircraft. The secondary antenna has a second acceptable service area for communication of the signal between the aircraft and the target satellite while satisfying the interference requirement with the non-target satellite. The second acceptable service area is different than the first acceptable service area. The antenna system also includes an antenna selection system to control communication of the signal between the aircraft and the target satellite via the primary antenna and the secondary antenna. The antenna selection system switches communication of the signal between the primary antenna and the secondary antenna based on a geographic location of the aircraft and the first and second acceptable service areas.

DETAILED DESCRIPTION

Figure 1:
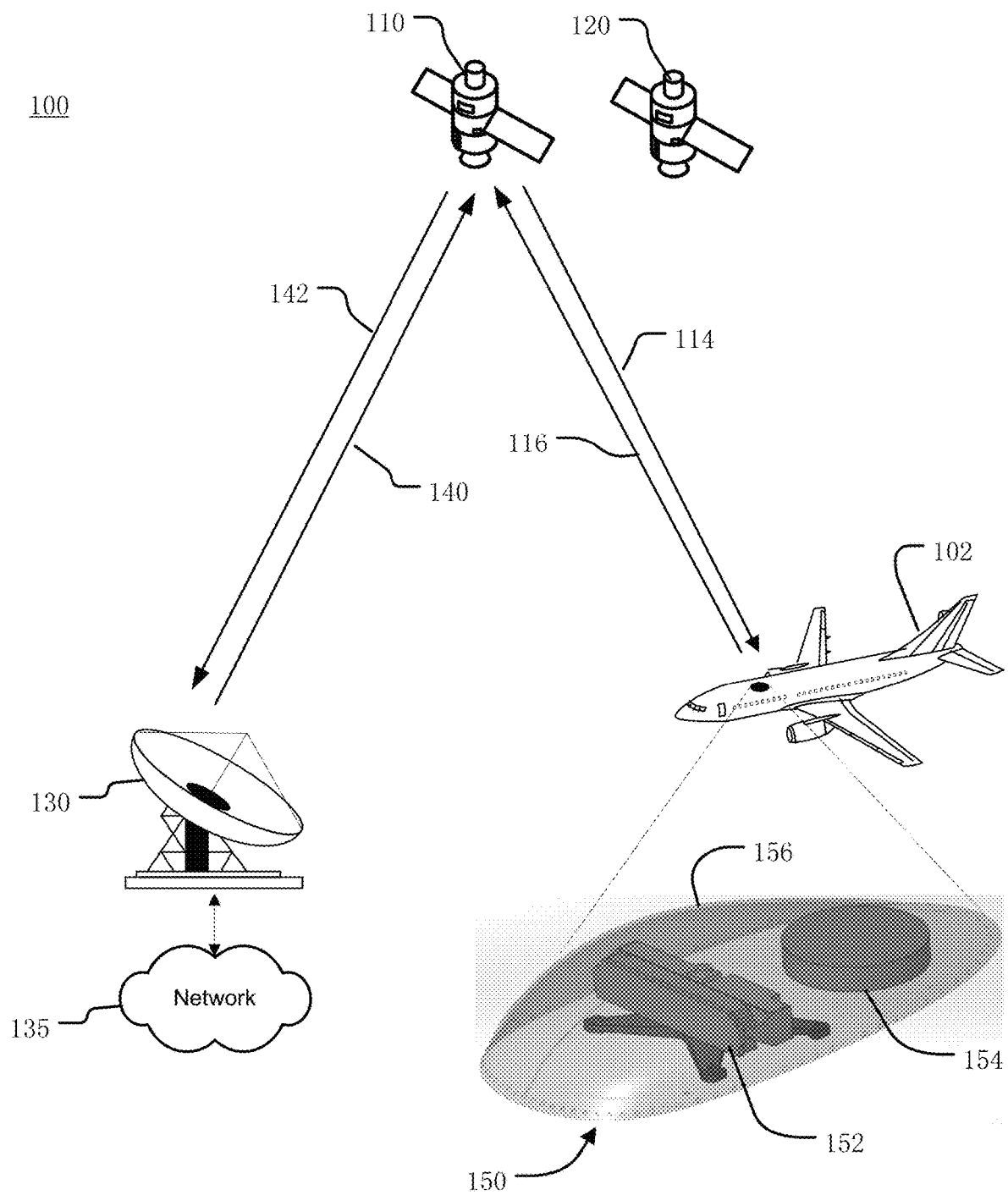
FIG. 1 illustrates an example satellite communications system in which an antenna system as described herein can be used to avoid excessive interference with one more satellites.

An airborne antenna system described herein can provide efficient communication with a target satellite over a large geographical area, while also satisfying interference requirements with other satellites. In some embodiments, the airborne antenna system can provide non-interfering communication with a target satellite, over the entire or substantially the entire coverage area (or footprint) of the target satellite. In doing so, services such as Internet, telephone and/or television services provided by the target satellite can be delivered to airborne users throughout most or all of the satellite's coverage area, while also satisfying interference requirements with other satellites.

The antenna system can include a primary antenna and a secondary antenna on an aircraft such as an airplane. The antenna system can also include an antenna selection system to control communication of one or more signals between the aircraft and the target satellite via the primary antenna and the secondary antenna.

The primary antenna can be mechanically steerable about at least one axis to point a main beam of the primary antenna at the target satellite. As used herein, a main beam of an antenna that is "pointed" at a satellite has sufficient antenna gain in the direction of the target satellite to permit communication of one or more signals. The communication can be bidirectional (i.e., the antenna transmits a signal to the satellite and also receives a signal from the satellite) or unidirectional (i.e., the antenna either transmits a signal to the satellite or receives a signal from the satellite, but not both). The direction of the target satellite may be boresight of the antenna. As used herein, "boresight" of an antenna refers to the direction of maximum gain of the antenna. Alternatively, the gain in the direction of the target satellite may be less than the maximum gain of the antenna. In other words, the direction of the satellite may not be in the exact center of the main beam of the antenna. This may for example be due to motion induced pointing accuracy limitations of the antenna.

In embodiments described herein, the primary antenna has a non-circular antenna aperture that results in an asymmetric antenna beam pattern at boresight. The non-circular shape of the antenna aperture can be due to the combination of electrical performance requirements and size constraints. Specifically, the non-circular antenna aperture of the primary antenna is designed to have a large enough effective area to provide sufficient antenna gain to satisfy link requirements between the aircraft and the target satellite under various operational conditions, while also having a swept volume small enough that it can be housed under an aerodynamic radome on the aircraft. The primary antenna can vary from embodiment to embodiment. In one embodiment, the primary antenna is an array of antenna elements arranged in a rectangular panel.

The asymmetric antenna beam pattern of the primary antenna has a narrow beamwidth axis and a wide beamwidth axis at boresight. As described in more detail below, when the antenna system is at certain geographic locations, the wide beamwidth axis can give rise to excessive interference with one or more other (non-target) satellites, if the primary antenna were used to communicate with the target satellite.

The antenna system described herein can avoid the excessive interference that could result due to the wide beamwidth axis of the primary antenna, thereby allowing non-interfering communication with the target satellite over a large geographic area. As described in more detail below, the antenna system includes a secondary antenna, which can be located underneath the same radome as the primary antenna, and an antenna selection system. The secondary antenna can be a different type of antenna than the primary antenna, and/or have a different beam steering mechanism than the primary antenna.

The antenna selection system controls whether the primary antenna or the secondary antenna is used to communicate each of the one or more signals communicated between the aircraft and the target satellite. Using the techniques described herein, the antenna selection system can determine when the amount of interference with one or more non-target satellites using the primary antenna, due to the wide beamwidth axis, reaches a threshold. In response to the determination, the antenna selection system can switch to communicating with the target satellite using the secondary antenna. In doing so, the antenna system described herein can provide communication with the target satellite at locations where use of the primary antenna is precluded due to interference requirements. As a result, the service area over which services provided by the target satellite can be delivered to airborne users can be larger as compared to only using the primary antenna.

FIG. 1 illustrates an example satellite communications system 100 in which an antenna system 150 as described herein can be used to avoid excessive interference with one more satellites. Many other configurations are possible having more or fewer components than the satellite communication system 100 of FIG. 1.

As can be seen in FIG. 1, the antenna system 150 is mounted on aircraft 102. In the illustrated embodiment, the aircraft 102 is an airplane. Alternatively, the antenna system 150 can be mounted to other types of aircraft, such as a helicopter, drone, etc.

As described in more detail below, the antenna system 150 facilitates communication between the aircraft 102 and satellite 110 (hereinafter referred to as the "target satellite 110"), while also satisfying interference requirements with one or more other (non-target) satellites. The antenna system 150 includes an antenna selection system (not shown) to control communication of one or more signals with the target satellite 110 via a primary antenna 152 and a secondary antenna 154, using the techniques described herein. In the illustrated embodiment, the primary antenna 152 and the secondary antenna 154 are located under the same radome 156. Alternatively, the primary antenna 152 and the secondary antenna 154 can be located under separate radomes on the aircraft.

In some embodiments in which the primary antenna 152 and the secondary antenna 154 are located under the same radome 156, the shape of the radome 156 may designed to house the primary antenna 152 and satisfy aerodynamic requirements, and the secondary antenna 154 may be selected or designed to fit within remaining room under the radome 156.

The antenna system 150 can also include memory for storage of data and applications, a processor for accessing data and executing applications, and components that facilitate communication over the satellite communication system 100. Although only one aircraft 102 is illustrated in FIG. 1 to avoid over complication of the drawing, the satellite communications system 100 can include many more aircraft 102 having respective antenna systems 150 mounted thereon.

In the illustrated embodiment, the target satellite 110 provides bidirectional communication between the aircraft 102 and a gateway terminal 130. The gateway terminal 130 is sometimes referred to as a hub or ground station. The gateway terminal 130 includes an antenna to transmit a forward uplink signal 140 to the target satellite 110 and receive a return downlink signal 142 from the target satellite 110. The gateway terminal can also schedule traffic to the antenna system 150. Alternatively, the scheduling can be performed in other parts of the satellite communications system 100 (e.g. a core node, satellite access node, or other components, not shown). Signals 140, 142 communicated between the gateway terminal 130 and target satellite 110 can use the same, overlapping, or different frequencies as signals 112, 114 communicated between the target satellite 110 and the antenna system 150.

Network 135 is interfaced with the gateway terminal 130. The network 135 can be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication between devices as described herein. The network 135 can include both wired and wireless connections as well as optical links. The network 135 can include both wired and wireless connections as well as optical links. The network 135 can connect multiple gateway terminals 130 that can be in communication with target satellite 110 and/or with other satellites.

The gateway terminal 130 can be provided as an interface between the network 135 and the target satellite 110. The gateway terminal 130 can be configured to receive data and information directed to the antenna system 150 from a source accessible via the network 135. The gateway terminal 130 can format the data and information and transmit forward uplink signal 140 to the target satellite 110 for delivery to the antenna system 150. Similarly, the gateway terminal 130 can be configured to receive return downlink signal 142 from the target satellite 110 (e.g. containing data and information originating from the antenna system 150) that is directed to a destination accessible via the network 135. The gateway terminal 130 can also format the received return downlink signal 142 for transmission on the network 135.

The target satellite 110 can receive the forward uplink signal 140 from the gateway terminal 130 and transmit corresponding forward downlink signal 114 to the antenna system 150. Similarly, the target satellite 110 can receive return uplink signal 116 from the antenna system 150 and transmit corresponding return downlink signal 142 to the gateway terminal 130. The target satellite 110 can operate in a multiple spot beam mode, transmitting and receiving a number of narrow beams directed to different regions on Earth. Alternatively, the target satellite 110 can operate in wide area coverage beam mode, transmitting one or more wide area coverage beams.

The target satellite 110 can be configured as a "bent pipe" satellite that performs frequency and polarization conversion of the received signals before retransmission of the signals to their destination. As another example, the target satellite 110 can be configured as a regenerative satellite that demodulates and remodulates the received signals before retransmission.

As shown in FIG. 1, the satellite communications system 100 also includes another satellite 120 (hereinafter referred to as "non-target satellite 120"). Communication of one or more signals between the non-target satellite 120 and the antenna system 150 is undesired or unintended. Although only one non-target satellite 120 is illustrated in FIG. 1 to avoid over complication of the drawing, the satellite communications system 100 can include many more non-target satellites 120 and the techniques described herein can be used to avoid excessive interference with each of the non-target satellites 120.

The non-target satellite 120 can, for example, be configured as a bent pipe or regenerative satellite. The non-target satellite 120 can communicate one or more signals with one or more ground stations (not shown) and/or other terminals (not shown).

As mentioned above, the antenna system 150 includes an antenna selection system to control communication with the target satellite 110 via the primary antenna 152 and the secondary antenna 156, while also avoiding excessive interference with the non-target satellite 120. The antenna system 150 is described in more detail below with respect to FIGS. 2-3 and others.

As used herein, interference "with" the non-target satellite 120 can refer to uplink interference and/or downlink interference. Uplink interference is interference to the non-target satellite 120 caused by a portion of the return uplink signal 116 transmitted by the antenna system 150 that is received by the non-target satellite 120. Downlink interference is interference to the antenna system 150 caused by a portion of a signal transmitted by the non-target satellite 120 that is received by the antenna system 150.

In the illustrated embodiment, the target satellite 110 and the non-target satellite 120 are each geostationary satellites. The geostationary orbit slots, and thus the angular separation along the geostationary arc between the target satellite 110 and the non-target satellite 120, can vary from embodiment to embodiment. In some embodiments the angular separation along the geostationary arc is at least two degrees. In alternative embodiments, one or both of the target satellite 110 and the non-target satellite 120 can be a non-geostationary satellite, such as a LEO or MEO satellite. The non-target satellite 120 can for example be adjacent to the target satellite 110. As used herein, the target satellite 110 and the non-target satellite 120 are "adjacent" if the effective angular separation between them as viewed at antenna system 150 is less than or equal to 10 degrees.

Figure 2:
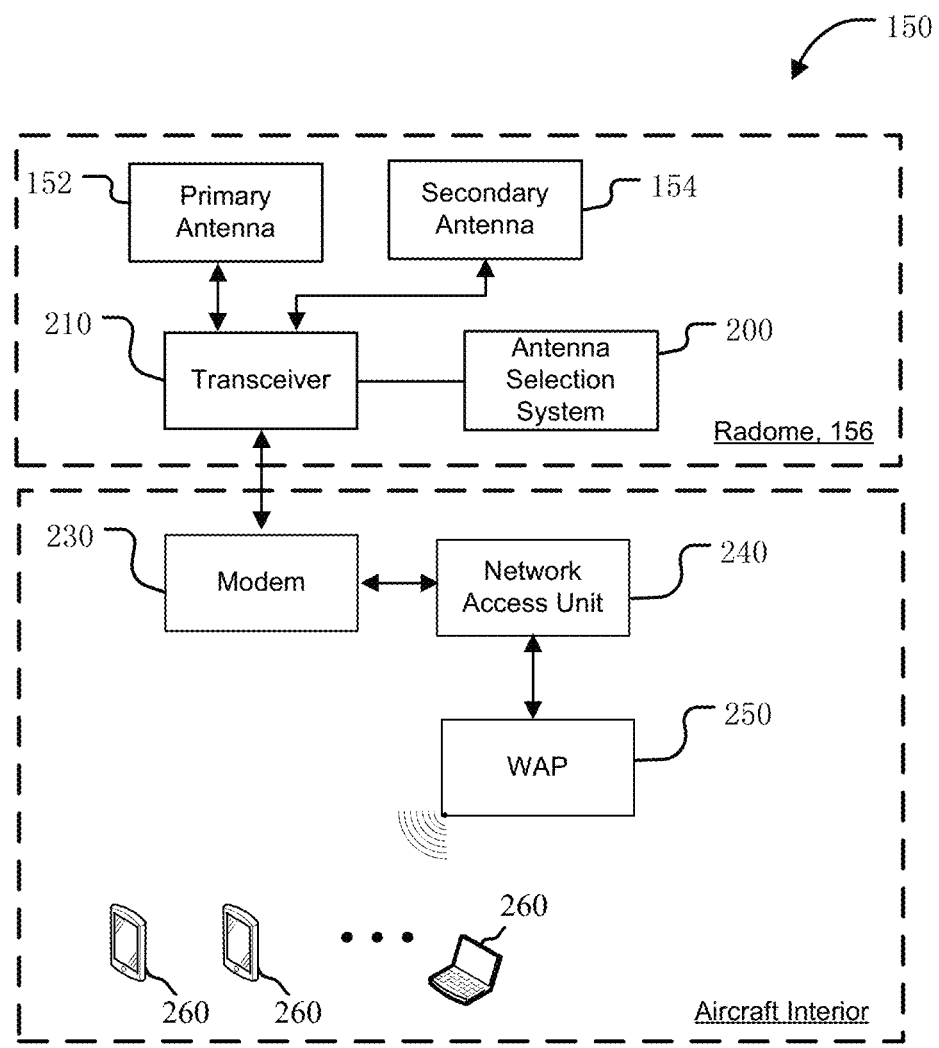
FIG. 2 is a block diagram illustrating an example antenna system on the aircraft of FIG. 1.

FIG. 2 is a block diagram illustrating an example antenna system 150 on the aircraft 102 of FIG. 1. The antenna system 150 can include primary antenna 152, secondary antenna 154, antenna selection system 200, transceiver 210, modem 230, network access unit (NAU) 240, and wireless access point (WAP) 250. Many other configurations are possible having more or fewer components than the antenna system 150 shown in FIG. 2. Moreover, the functionalities described herein can be distributed among the components in a different manner than described herein.

In the illustrated embodiment, the primary antenna 152 and the secondary antenna 154 are each housed under the same radome 156 disposed on the top of the fuselage or other location (e.g., on the tail, etc.) of the aircraft 102. Alternatively, the primary antenna 152 and the secondary antenna 154 can be housed under separate radomes which can be located in different locations on the aircraft 102.

The antenna system 150 can provide for transmission of the forward downlink signal 114 and reception of the return uplink signal 116 to support two-way data communications between data devices 260 within the aircraft 102 and the network 135 via target satellite 110 and gateway terminal 130. The data devices 260 can include mobile devices (e.g., smartphones, laptops, tablets, netbooks, and the like) such as personal electronic devices (PEDs) brought onto the aircraft 102 by passengers. As further examples, the data devices 260 can include passenger seat back systems or other devices on the aircraft 102. The data devices 260 can communicate with the network access unit 240 via a communication link that can be wired and/or wireless. The communication link can be, for example, part of a local area network such as a wireless local area network (WLAN) supported by WAP 250. One or more WAPs can be distributed about the aircraft 102, and can, in conjunction with network access unit 240, provide traffic switching or routing functionality; for example, as part of a WLAN extended service set (ESS), etc. The network access unit 240 can also allow passengers to access one or more servers (not shown) local to the aircraft 102, such as a server that provides in-flight entertainment.

In operation, the network access unit 240 can provide uplink data received from the data devices 260 to the modem 230 to generate modulated uplink data (e.g. a transmit IF signal) for delivery to the transceiver 210. The transceiver 210 can upconvert and then amplify the modulated uplink data to generate the return uplink signal 116 (FIG. 1) for transmission to the target satellite 110 (FIG. 1) via the primary antenna 152 or the secondary antenna 154. Similarly, the transceiver 210 can receive the forward downlink signal 114 (FIG. 1) from the target satellite 110 (FIG. 1) via the primary antenna 152 or the secondary antenna 154. The transceiver 210 can amplify and then downconvert the forward downlink signal 114 to generate modulated downlink data (e.g., a receive IF signal) for demodulation by the modem 230. The demodulated downlink data from the modem 230 can then be provided to the network access unit 240 for routing to the data devices 260. The modem 230 can be integrated with the network access unit 240, or can be a separate component, in some examples.

In the illustrated embodiment, the transceiver 210 is located outside the fuselage of the aircraft 102 and under the radome 156. Alternatively, the transceiver 210 can be located in a different location, such as within the aircraft interior. In the illustrated embodiment, the transceiver 210 is shared between the primary antenna 152 and the secondary antenna 154. Alternatively, the antenna system 150 may include a first transceiver coupled to the primary antenna 152, and a second transceiver coupled to the secondary antenna 154. In such a case, the modem 230 may be shared by the first transceiver and the second transceiver, or may use separate modems.

As described in more detail below, the antenna selection system 200 can control whether the primary antenna 152 or the secondary antenna 154 is used to receive the forward downlink signal 114 from the target satellite 110, and also whether the primary antenna 152 or the secondary antenna 154 is used to transmit the return uplink signal 116 to the target satellite 110. The functions of the antenna selection system 200 can be implemented in hardware, instructions embodied in a memory and formatted to be executed by one or more general or application-specific processors, firmware, or any combination thereof. In the illustrated embodiment, the antenna selection system 200 is shown as a separate device. Alternatively, some or all of the components or features of the antenna selection system 200 can be implemented within one or more other components of the antenna system 150. In the illustrated embodiment, the antenna selection system 200 is located under the radome 156. Alternatively, some or all of the antenna selection system 200 can be located in a different location, such as within the aircraft interior. As another example, some or all of the antenna selection system 200 may be located in other parts of the satellite communications system 100, such as the gate terminal 130, a core node, satellite access node, or other components not shown.

The primary antenna 152 can include an array of antenna elements that are operable over the frequency ranges of both the forward downlink signal 114 and the return uplink signal 116. In such a case, the same antenna elements of the array can transmit the return uplink signal 116 and receive forward downlink signal 114. Alternatively, the primary antenna 152 can include a first group of one or more antenna elements to transmit the return uplink signal 116, and a second group of one or more antenna elements to receive forward downlink signal 114.

The primary antenna 152 can include a positioner rotatably coupled to the array of the primary antenna 152 to mechanically steerable the array about at least one axis to point the main beam of the array of the primary antenna 210 at the target satellite 110 as the aircraft 102 moves. In some embodiment, the primary antenna 152 is fully mechanically steered using an elevation-over-azimuth (EL/AZ), two-axis positioner. Alternatively, the positioner may include other mechanisms for providing adjustment in azimuth and elevation. For example, in some alternative embodiments, the primary antenna 152 can include a combination of mechanical and electrical scanning mechanisms. As another example, the primary antenna 152 includes a fully mechanically steered using three-axis positioner to provide adjustment in azimuth, elevation and skew. The primary antenna 152 can also include an antenna control unit to provide control signals to the positioner.

The primary antenna 152 has a non-circular antenna aperture that results in an asymmetric antenna beam pattern of the main beam at boresight. The non-circular shape of the antenna aperture can be due to the combination of electrical performance requirements and size constraints. Specifically, the non-circular antenna aperture of the primary antenna 152 can be designed to have a large enough effective area to provide sufficient antenna gain to satisfy link requirements between the aircraft 102 and the target satellite 110 under various operational conditions, while also having a swept volume small enough that it can be housed under an aerodynamic radome 156 on the aircraft 102.

The primary antenna 152 can be any type of antenna that fits under an aerodynamic radome and provides an asymmetric antenna beam pattern, and can vary from embodiment to embodiment. In some embodiments, the primary antenna 152 is an array of waveguide antenna elements arranged in a rectangular panel. Each of the one or more antenna elements can include a waveguide-type feed structure including a horn antenna. Alternatively, other types of structures and antenna elements can be used for the primary antenna 210. For example, in another embodiment, the primary antenna 210 can include one or more feeds illuminating a reflector having an asymmetric reflector surface. As another example, the primary antenna 152 can include multiple, separately moveable panels that together provides an asymmetric antenna aperture.

The asymmetric antenna beam pattern of the primary antenna 152 has a wide beamwidth axis and a narrow beamwidth axis. As described in more detail below, when the antenna system 150 (and thus the aircraft 102) is at certain geographic locations, the wide beamwidth axis can give rise to excessive interference with the non-target satellite 120, if the primary antenna 152 were used to communicate with the target satellite 110.

When using the primary antenna 152 to communicate with the target satellite 110, the antenna selection system 200 can switch to communicating with the target satellite 110 using the secondary antenna 154 when the amount of interference with the non-target satellite 120, due to the wide beamwidth axis, reaches a threshold. In doing so, the antenna system 150 can provide communication with target satellite 110 at geographic locations where use of the primary antenna 152 is precluded due to interference requirements. As a result, the techniques described herein can ensure that the interference generated is within acceptable limits to other satellite system operators, while at the same time satisfying link requirements between the aircraft 102 and the target satellite 110.

The secondary antenna 154 can include an array of antenna elements and a steering mechanism for pointing a main beam of the array at the target satellite 110 as the aircraft 102 moves. The secondary antenna 154 can be a different type of antenna than the primary antenna 152, and/or have a different beam steering mechanism than the primary antenna 152. As described in more detail below, the secondary antenna 152 is arranged relative to the primary antenna, and has different composite beamwidth characteristics versus skew angle than the primary antenna 152 at various geographic locations, such that the secondary antenna 154 can provide an acceptable service area for communication with target satellite 110 that is different than the acceptable service area provided by the primary antenna 152.

Thus, at a given geographic location that is within the acceptable service area of the secondary antenna 154 and also outside the acceptable service area of the primary antenna 152, the secondary antenna 154 can satisfy interference requirements with the non-target satellite 110. In other words, switching to the secondary antenna 154 can reduce interference with the non-target satellite 120 as compared to the primary antenna 152, while still permitting communication between the aircraft 102 and the target satellite 110. In doing so, the secondary antenna 152 can provide for communication with the target satellite 110 at geographic locations where use of the primary antenna 152 is precluded due to interference requirements.

At some or all of geographic locations for the aircraft 102, the primary antenna 152 may be designed to provide better performance characteristics than the secondary antenna 154 for communicating at least one of the return uplink signal 116 and the forward downlink signal 114 with the target satellite 110. For example, the primary antenna 152 can have one or more of higher gain, lower sidelobes, cross-polarization, etc.

As used herein, the interference "with" non-target satellite 120 can be uplink interference and/or downlink interference. Uplink interference is interference to the non-target satellite 120 caused by electromagnetic energy from a portion of the return uplink signal 116 that is received by the non-target satellite 120. Downlink interference is interference to the antenna system 150 caused by radiated electromagnetic energy from the non-target satellite 120 that is received by the antenna system 150. The downlink interference can increase the equivalent noise temperature at a receiver of the antenna system 150, which in turn reduces the signal-to-noise ratio of the forward downlink signal 114 received by the antenna system 150.

The antenna selection system 200 can switch between the primary antenna 152 and the secondary antenna 154 based one or more thresholds for the amount of interference with the non-target satellite 120. The one or more thresholds can be based on uplink interference and/or downlink interference and can vary from embodiment to embodiment.

In some embodiments, the same threshold can be used for switching from the primary antenna 152 to the secondary antenna 154, and for switching from the secondary antenna 152 to the primary antenna 152. In other words, the antenna selection system 200 can switch from the primary antenna 152 to the secondary antenna 154 when the amount of interference reaches the threshold, and switch back to the primary antenna 152 when the amount of interference using the primary antenna 152 will be below the threshold. In some other embodiments, the threshold for switching from the primary antenna 152 to the secondary antenna 154 can be different than the threshold for switching from the secondary antenna 154 to the primary antenna 152. In such a case, the antenna selection system 200 can avoid rapidly switching between the antennas 152, 154 when the aircraft 102 is near the boundary of the acceptable service area of the primary antenna 152.

In some embodiments, the value of the threshold for switching transmission of the return uplink signal 116 from the primary antenna 152 to the secondary antenna 154 can for example be based on regulatory requirements imposed by regulatory agencies (e.g. FCC, ITU, etc.) on the maximum power spectral density (or other metric) that can be radiated to the non-target satellite 120, or coordination agreements with the operator of the non-target satellite 120. Additionally, the threshold for switching transmission of the return uplink signal 116 from the primary antenna 152 to the secondary antenna 154 can account for one or more of motion induced pointing accuracy limitations of the primary antenna 152, etc.

The antenna selection system 200 can determine when to switch based on a comparison(s) of the threshold(s) to the amount of interference with the non-target satellite 120 at the current geographic location and attitude of the aircraft 102. The current geographic location may for example be provided via a global positioning system (GPS) or other equipment on the aircraft 102. The attitude (including yaw, roll and pitch) of the aircraft 102 may for example be provided via an internal reference unit (IRU) on the aircraft 102.

The amount of interference at a given geographic location can be determined using various techniques, and can be characterized or represented in different ways. For example, in some embodiments the amount of interference is represented in terms of power spectral density (PSD).

The amount of uplink interference can for example be determined based on one or more of the known antenna pattern characteristics of the primary antenna 152 and the secondary antenna 154, the transmission parameters (e.g. transmit power, frequency range, etc.) of the return uplink signal 116, the geographic location of the aircraft 102, the attitude of the aircraft 102, the locations of the target satellite 110 and non-target satellite 120, the operating frequency, system gain-to noise temperature (G/T) and/or polarization of operation of the non-target satellite 120, etc. Alternatively, other and/or additional information can be used to calculate the amount of interference. The amount of downlink interference can be calculated in a similar manner based on the parameters of a signal from the non-target satellite 120 that is received by the antenna system 150.

In some embodiments, the comparison of the threshold(s) to the amount of interference at the various geographic locations has been previously calculated for each of the primary antenna 152 and the secondary antenna 154. In such a case, the antenna selection system 200 can store a look-up table indicating which of the primary antenna 152 and secondary antenna 154 to use based on the current geographic location and attitude of the aircraft 102.

The manner in which the antenna selection system 200 controls the switching between the primary antenna 152 and the secondary antenna 154 can vary from embodiment to embodiment. In some embodiments, the antenna selection system 200 provides control signals to the transceiver 210 (or transceivers) to enable/disable operation of electronics associated with the primary antenna 152 and the secondary antenna 154. In other embodiments, the antenna selection system 200 controls switches that route the signals between the modem 230 and the antennas 152, 154 through the transceiver 210. Alternatively, other techniques can be used.

In some embodiments, the antenna selection system 200 switches both the transmission of return uplink signal 116 and the reception of forward downlink signal 114 when switching between the primary antenna 152 and the secondary antenna 154. In such a case, the same antenna (either primary antenna 152 or the secondary antenna 154) is used for transmitting the return uplink signal 116 and for receiving the forward downlink signal 114 at a particular time during operation.

In some other embodiments, the antenna selection system 200 switches only one of the transmission of return uplink signal 116 and the reception of forward downlink signal 114 when switching between the primary antenna 152 and the secondary antenna 154. For example, in embodiments in which the switching is done to avoid excessive uplink interference with the non-target satellite 120, the primary antenna 152 can be used to receive forward downlink signal 114 regardless of whether the return uplink signal 116 is transmitted via the primary antenna 152 or the secondary antenna 154. In doing so, overall system performance can be improved in embodiments in which downlink interference is not excessive and the primary antenna 152 can provide better performance characteristics (e.g. higher gain, etc.) than the secondary antenna 154 for reception of the forward downlink signal 114. Using the secondary antenna 154 only for transmission of the return uplink signal 116 may simplify the secondary antenna 154 and the associated electronics. For example, the secondary antenna 154 may be operable over the frequency range of the return uplink signal 116, but not the frequency range of the forward downlink signal 114. In embodiments in which the primary antenna 152 is coupled to a dedicated transceiver, the secondary antenna 154 can be coupled to a transmitter rather than another transceiver. As another example, the primary antenna 152 may be coupled to a receiver, and a shared transmitter may be selectively switched between the primary antenna 152 and the secondary antenna 154.

In addition to switching between the primary antenna 152 and the secondary antenna 154, the antenna selection system 200 can also change the transmission parameters of the return uplink signal 116 to avoid excessive interference when needed. For example, the antenna selection system 200 can change one or more of transmitted power level of the return uplink signal 116, spreading the return uplink signal 116 over a larger bandwidth, or any other technique for reducing the power spectral density in the direction of the non-target satellite 120.

In some embodiments, the primary antenna 152 and the secondary antenna 154 each remain pointed at the target satellite 110 regardless of which antenna 152, 154 is currently being used. In other words, the antenna system 150 maintains pointing of the primary antenna 152 and the secondary antenna 154 at the target satellite 110 following switching of the communication with the target satellite 110. In such a case, the handover time between the primary antenna 152 and the secondary antenna 154 can be minimized.

In some embodiments, the antenna system 150 maintains the return link operating point (e.g., energy per symbol to noise power spectral density $E_s/N_0$) regardless of whether the primary antenna 152 and the secondary antenna 154 is used to transmit the return uplink signal 116. For example, in embodiments in which the gain of the primary antenna 152 is greater than the gain and the secondary antenna 154, the antenna system 150 may increase the transmit power of the return uplink signal 116 upon switching from the primary antenna 152 to the secondary antenna 154. The antenna system 150 may then reduce the transmit power upon switching back to the primary antenna 152. In some alternative embodiments, the antenna system 105 can have different return link operating points for the primary antenna 152 and the secondary antenna 154. The different operating points can be due to differences in the gains of the primary antenna 152 and the secondary antenna 154, and/or different transmit powers of the return uplink signal 116 when using the primary antenna 152 and the secondary antenna 154.

Figure 3:
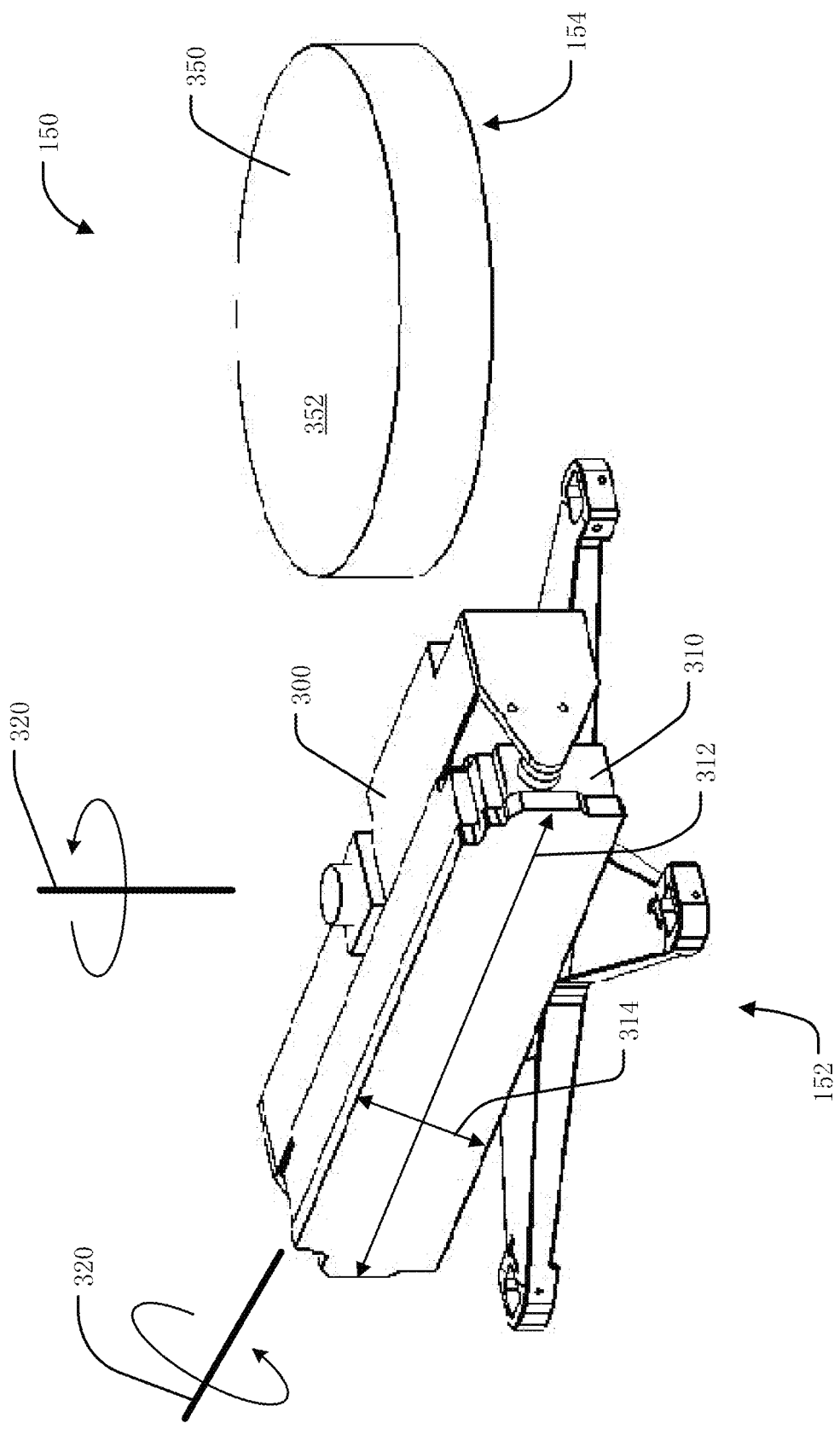
FIG. 3 illustrates a perspective view of an example primary antenna and an example secondary antenna of an example antenna system.

FIG. 3 illustrates a perspective view of an example primary antenna 152 and an example secondary antenna 154 of an example antenna system 150.

The primary antenna 152 can include a positioner 300 and an array 310 of antenna elements. The array 310 of antenna elements has a non-circular aperture that includes a major axis 312 (referred to hereinafter as "horizontal axis 312"), which is the longest line through the center of array 310 of antenna elements. The array 310 of antenna elements that also includes a minor axis (referred to hereinafter as "vertical axis 314"), which is the shortest line through the center of the array 310 of antenna elements. The non-circular aperture of the array 310 of antenna elements defines an antenna beam having an asymmetric antenna beam pattern at boresight.

In the illustrated embodiment, the array 310 of antenna elements is a direct radiating two-dimensional array which results in boresight being normal to a plane containing the antenna elements of the array 310. As a result, in the illustrated embodiment the asymmetric antenna beam pattern has a narrow beamwidth axis aligned with the horizontal axis 312 and a wide beamwidth axis aligned with the vertical axis 314. Alternatively, the array 310 of antenna elements can be arranged and/or fed in a different manner such that boresight is not normal to the plane containing the antenna elements of the array 310.

The positioner 300 is responsive to commands from an antenna control unit (not shown) of the antenna system 150 to mechanically steer the primary antenna 152 to point the main beam of the array 310 in the direction of the target satellite 110. In the illustrated embodiment the positioner 300 is an elevation-over-azimuth (EL/AZ) two-axis positioner that provides full two-axis mechanical steering. The positioner 300 includes a mechanical azimuth adjustment mechanism to move the primary antenna 152 in azimuth 320, and a mechanical elevation adjustment mechanism to move the primary antenna 152 in elevation 320. Each of the mechanical adjustment mechanisms can for example include a motor with gears and other elements to provide for movement of the primary antenna 152 around a corresponding axis. In some alternative embodiments, the steering mechanism for the primary antenna 152 may include a combination of mechanical and electrical steering of the main beam.

The secondary antenna 154 can include an array 350 of antenna elements having a main beam. The secondary antenna 154 includes a steering mechanism to point the main beam of the array 350 at the target satellite 110. The type of antenna elements, orientation of the antenna elements, and the steering mechanism of the secondary antenna 154 can vary from embodiment to embodiment. In some embodiments, the array 350 includes antenna elements that are operable over the frequency ranges of both the forward downlink signal 114 and the return uplink signal 116. In such a case, the same antenna elements of the array 350 can transmit the return uplink signal 116 and receive the forward downlink signal 114. In some alternative embodiments, the array 350 includes a first group of one or more antenna elements to transmit the return uplink signal 116, and a second group of one or more antenna elements to receive the forward downlink signal 114. In embodiments in which the secondary antenna 154 is only used for transmission of the return uplink signal 116, the antenna of the array 350 may be operable over the frequency range of the return uplink signal 116, but not the frequency range of the forward downlink signal 114.

In the illustrated embodiment, the antenna elements of the array 350 are arranged in a circular two-dimensional array arranged in a plane 352. Alternatively, the antenna elements of the array 350 may be arranged in a different fashion. For example, the array 350 may have a non-circular antenna aperture that results in an asymmetric antenna beam pattern at boresight. In such a case, the asymmetric antenna beam pattern of the secondary antenna 154 has a narrow beamwidth axis and a wide beamwidth axis at boresight. In some embodiments, the steering mechanism of the secondary antenna 154 includes a mechanical azimuth adjustment mechanism responsive to commands (e.g., from an antenna control unit, the antenna selection system, etc.) to rotate the secondary antenna 154 in azimuth, and an azimuth/elevation adjustment mechanism to steer the main beam of the secondary antenna 154 in the direction of the target satellite. As the aircraft 102 moves, the mechanical azimuth adjustment mechanism can be used to maintain alignment of the narrow beamwidth axis with a line defined by the target satellite 110 and the non-target satellite 120. By aligning the narrow beamwidth axis with that line, the amount of interference with the non-target satellite 120 can be minimized while the secondary antenna 154 is being used.

In the illustrated embodiment, the array 350 is a non-movable, fully electronic scanned phased array antenna. The array 350 can include feed networks and phase controlling devices to properly phase signals communicated with some or all the antenna elements of the array 350 to scan the beam in azimuth and elevation from the normal to the plane 352.

Alternatively, the secondary antenna 154 can include a different steering mechanism, which can vary based on the antenna type of the secondary antenna 154. For example, in some alternative embodiments, the secondary antenna 154 can be an electro-mechanically steered array that includes one mechanical scan axis and one electrical scan axis, such as a variably inclined continuous transverse stub (VICTS) antenna. As another example, the secondary antenna 154 can be an offset fed, parabolic cylinder reflector antenna, such as an antenna of the type of DBS-2130 antenna available from L-3 Communications. As yet another example, the secondary antenna 154 can be an EXPLORER 9092H or 9092M antenna available from Cobham, plc.

The combination of the primary antenna 152 and the secondary antenna 154 can vary from embodiment to embodiment. In some embodiments in which the target satellite 110 operates at Ka-band, the primary antenna 152 is Aero Mobile Terminal Model 2540 available from ViaSat Inc., and the secondary antenna 154 is a ThinAir Falcon-Ka2517 VICTS antenna available from ThinKom. In embodiments in which the secondary antenna 154 is only used for transmission of the return uplink signal 116, the secondary antenna 154 may only include the transmit antenna aperture of the ThinAir Falcon-Ka2517.

Figure 4A:
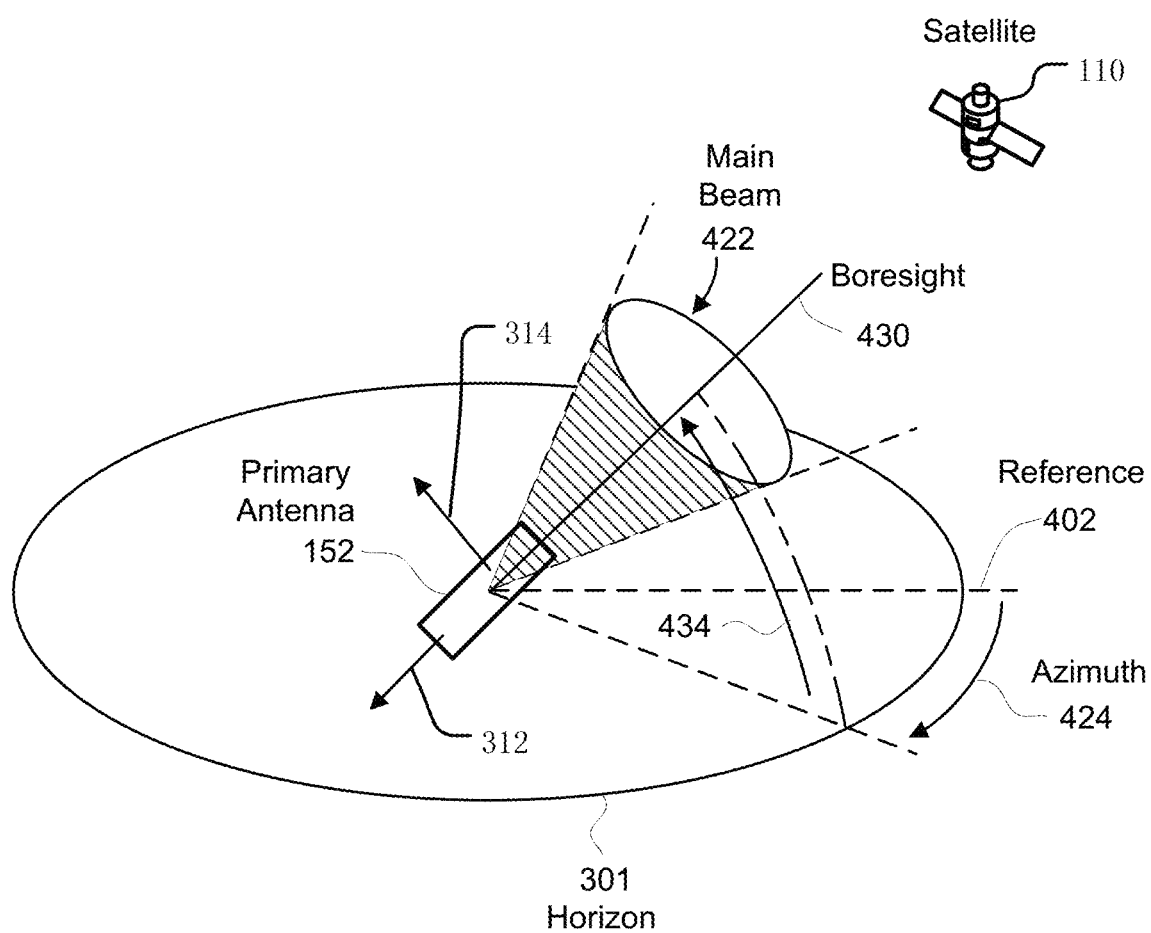
FIG. 4A illustrates a perspective view of the main beam of an example asymmetric antenna pattern of an example primary antenna.

FIG. 4A illustrates a perspective view of the main beam 422 of an example asymmetric antenna pattern of an example primary antenna 152. The main beam 422 has a 3-dB (half power) contour with an elliptical shape about boresight 430. The positioner 300 (FIG. 3) can move the primary antenna 152 to point the boresight 430 of the main beam 422 is the direction of the target satellite 110. The direction can be described in terms of azimuth 424 and elevation 434. Azimuth 424 refers to the angle between boresight 430 and reference 402, and elevation 434 refers to the angle between boresight 430 and horizon 401.

Figure 4B:
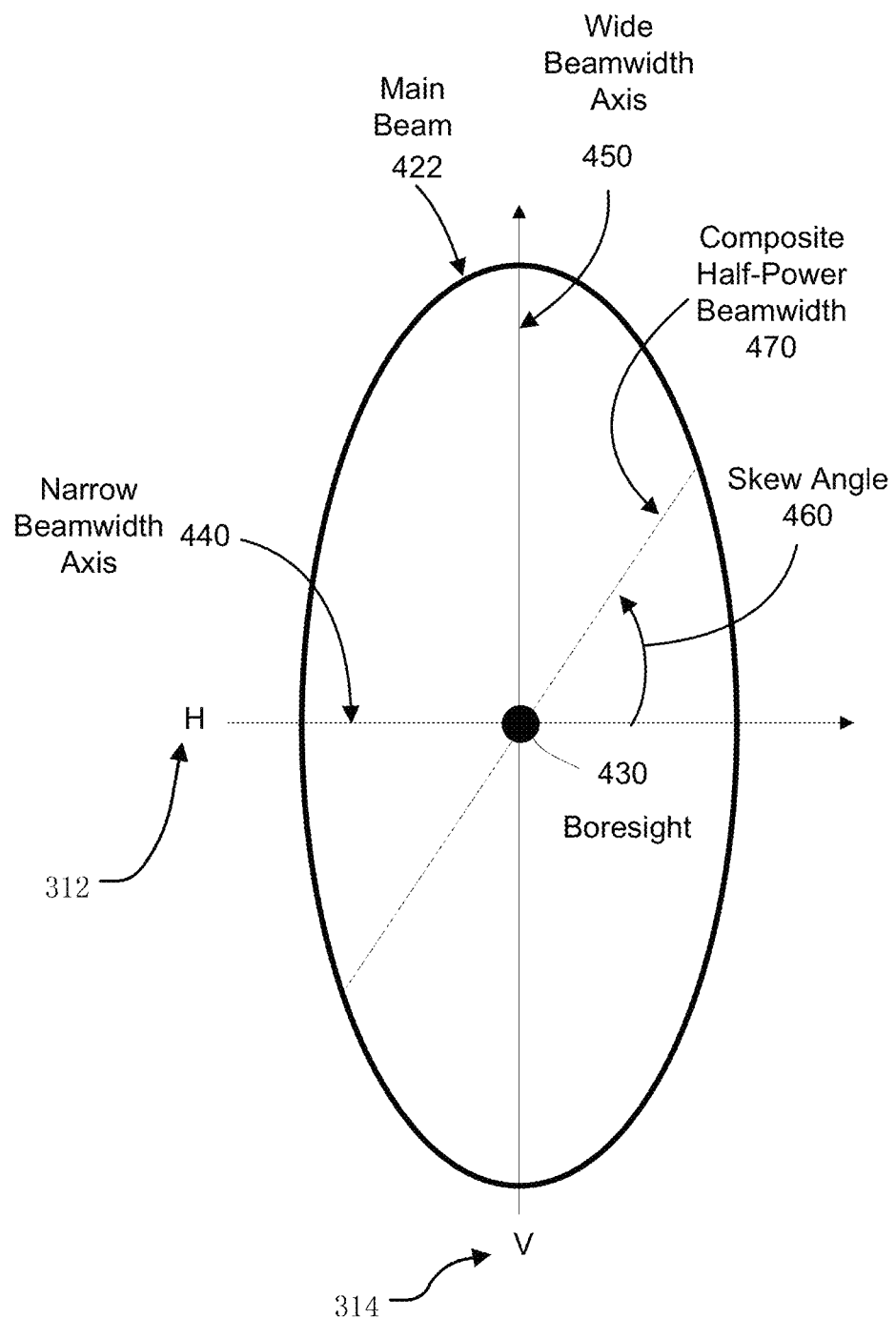
FIG. 4B illustrates an example half-power contour of the asymmetric antenna pattern of main beam FIG. 4A.

FIG. 4B illustrates an example half-power contour of the asymmetric antenna pattern of main beam 422 FIG. 4A. The main beam 422 has a first half-power beamwidth (hereinafter referred to as "horizontal half-power beamwidth") along the narrow beamwidth axis 440 that corresponds to the horizontal axis 312 of the primary antenna 152, and a second half-power beamwidth (hereinafter referred to as "vertical half-power beamwidth) along the wide beamwidth axis 450 corresponding to the vertical axis 314 of the primary antenna 152. The horizontal half-power beamwidth and the vertical half-power beamwidth can vary from embodiment to embodiments. In some embodiments, the vertical half-power beamwidth is at least three times greater than the horizontal half-power beamwidth, such as being at least four times greater. For example, in some embodiments the vertical half-power beamwidth can be less than three degrees, and the horizontal half-power beamwidth can be less than one degree. Alternatively, the vertical half-power beamwidth and the horizontal half-power beamwidth may be different than the examples above.

As shown in FIG. 4B, the main beam 422 has a skew angle 460. As used herein, "skew angle" refers to the angle between the narrow beamwidth axis of the main beam of an antenna (e.g. narrow beamwidth axis 440 of the main beam 422), and a line defined by the target satellite 110 and the non-target satellite 120. The half-power beamwidth of the main beam 422 along the line defined by the target satellite 110 and non-target satellite 120 is referred to herein as a "composite half-power beamwidth" 470. The composite half-power beamwidth 470 is a mixture of the half-power beamwidths along the narrow beamwidth axis and wide beamwidth axis respectively, and depends on the skew angle 460. For example, in embodiments in which the target satellite 110 and the non-target satellite 120 are geostationary satellites along the geostationary arc, the skew angle 460 is the angle between the narrow beamwidth axis 440 and the geostationary arc, and the composite half-power beamwidth 470 is the beamwidth along the geostationary arc.

The skew angle 460, and thus the composite half-power beamwidth 470, varies depending upon the geographic location of the aircraft 102 that includes the antenna system 150. For example, if the antenna system 150 is located at the same longitude as the target satellite 110, the skew angle 460 is zero degrees and the composite half-power beamwidth 470 is the horizontal half-power beamwidth along the narrow beamwidth axis 440. In such a case, the composite half-power beamwidth 470 can be narrow enough to satisfy interference requirements with the non-target satellite 120. However, if the antenna system is located at a different longitude than the target satellite 110, the skew angle 460 is non-zero and the composite half-power beamwidth 470 is a mixture of the vertical half-power beamwidth and the horizontal half-power beamwidth. As a result, at certain geographic locations, the composite half-power beamwidth 470 can be wide enough to cause excessive interference with the non-target satellite 120, if the primary antenna 152 were used to communicate with target satellite 110. In other words, due to the vertical half-power beamwidth along the wide beamwidth axis 450, at certain geographic locations within the service area of the target satellite 110, the interference level could exceed the threshold amount of interference with the non-target satellite 120 if the primary antenna 152 were used.

Figure 4C:
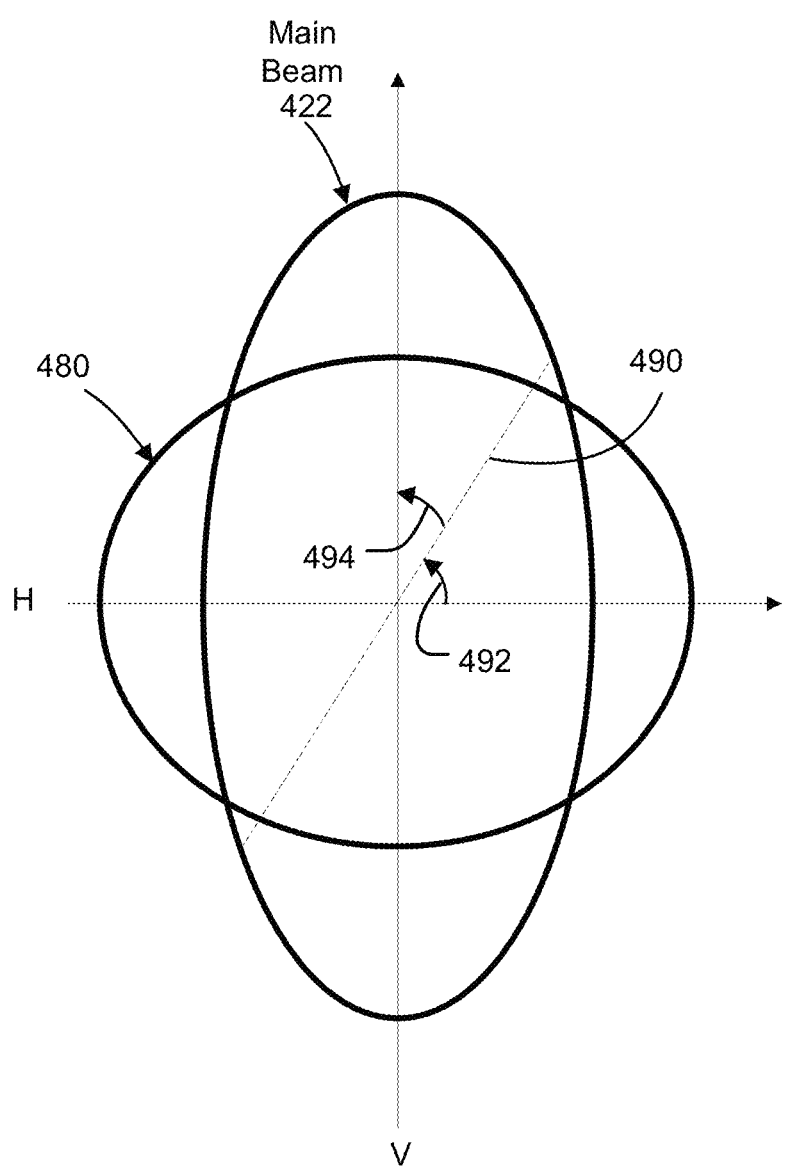
FIG. 4C illustrates an example contour of the main beam of the secondary antenna at a particular scan angle to the target satellite, overlayed with the contour of main beam of FIG. 4B.

FIG. 4C illustrates an example contour of the main beam 480 of the secondary antenna 154 at a particular scan angle to the target satellite 110, overlayed with the contour of main beam 422 of FIG. 4B. In embodiments in which the secondary antenna 154 is electronically scanned in at least one axis, the contour of the main beam 480 can vary with pointing direction (scan angle) to the target satellite 110. In other words, at least one of the vertical half-power beamwidth and the horizontal half-power beamwidth of the main beam 480 of the secondary antenna 154 can vary based on the geographic location of the aircraft 102. In embodiments in which the primary antenna 152 is fully mechanically steered, the main beam 422 does not vary with pointing direction.

The vertical half-power beamwidth and the horizontal half-power beamwidth of the main beam 480 of the secondary antenna 154 can vary from embodiment to embodiment. In some embodiments, the vertical half-power beamwidth is less than three times than the horizontal half-power beamwidth.

Line 490 represents the maximum acceptable skew angle for the main beam 422 of the primary antenna 152 that satisfies interference requirements with the non-target satellite 120. That is, for a range 492 of skew angles, the composite half-power beamwidth of the main beam 422 is less than or equal to a particular value, such that the amount of interference with the non-target satellite 120 when using the primary antenna 152 is at or below the threshold. Accordingly, for a range 494 of skew angles, the composite half-power beamwidth of the main beam 422 is greater than the particular value, such that the amount of interference with the non-target satellite 120 would exceed the threshold if the primary antenna 152 were used.

As can be seen in FIG. 4B, for the range 494 of skew angles, the composite half-power beamwidth of the main beam 480 of the secondary antenna 154 is less than the particular value of the composite half-power beamwidth of the main beam 422 along the line 490. Thus, for a group of geographic locations corresponding to the range 494 of skew angles at which the amount of interference with the non-target satellite 120 using the primary antenna 152 exceeds the threshold, the interference level when using secondary antenna 154 can be less than or equal to the threshold, such that the secondary antenna 154 can be used to communicate with the target satellite 110. The antenna selection system 200 can thus switch from the primary antenna 152 to the secondary antenna 154 when the skew angle reaches the maximum acceptable skew angle. Similarly, when the skew angle returns to a value below the maximum acceptable skew angle, the antenna selection system 200 can switch back to the primary antenna 152.

In the illustrated embodiment, range 494 of skew angles extends from the line 490 to the wide beamdwidth axis 450 (FIG. 4B) corresponding to the skew angle of ninety degrees. In such a case, the secondary antenna 154 can avoid excessive interference with the non-target satellite 120 at all the geographic locations at which the main beam 480 of the secondary antenna 154 has the contour illustrated in FIG. 4C. Alternatively, the range 494 of skew angles may not extend to the skew angle of 90 degrees.

The range 492 of skew angles and the range 494 of skew angles can vary from embodiment to embodiment. In some embodiments, range 492 of skew angles is at least 40 degrees, and the range 494 of skew angles is at least 30 degrees. For example, range 492 of skew angles may be from zero to sixty degrees, and range 494 of skew angles may be from sixty to ninety degrees.

Figure 5A:
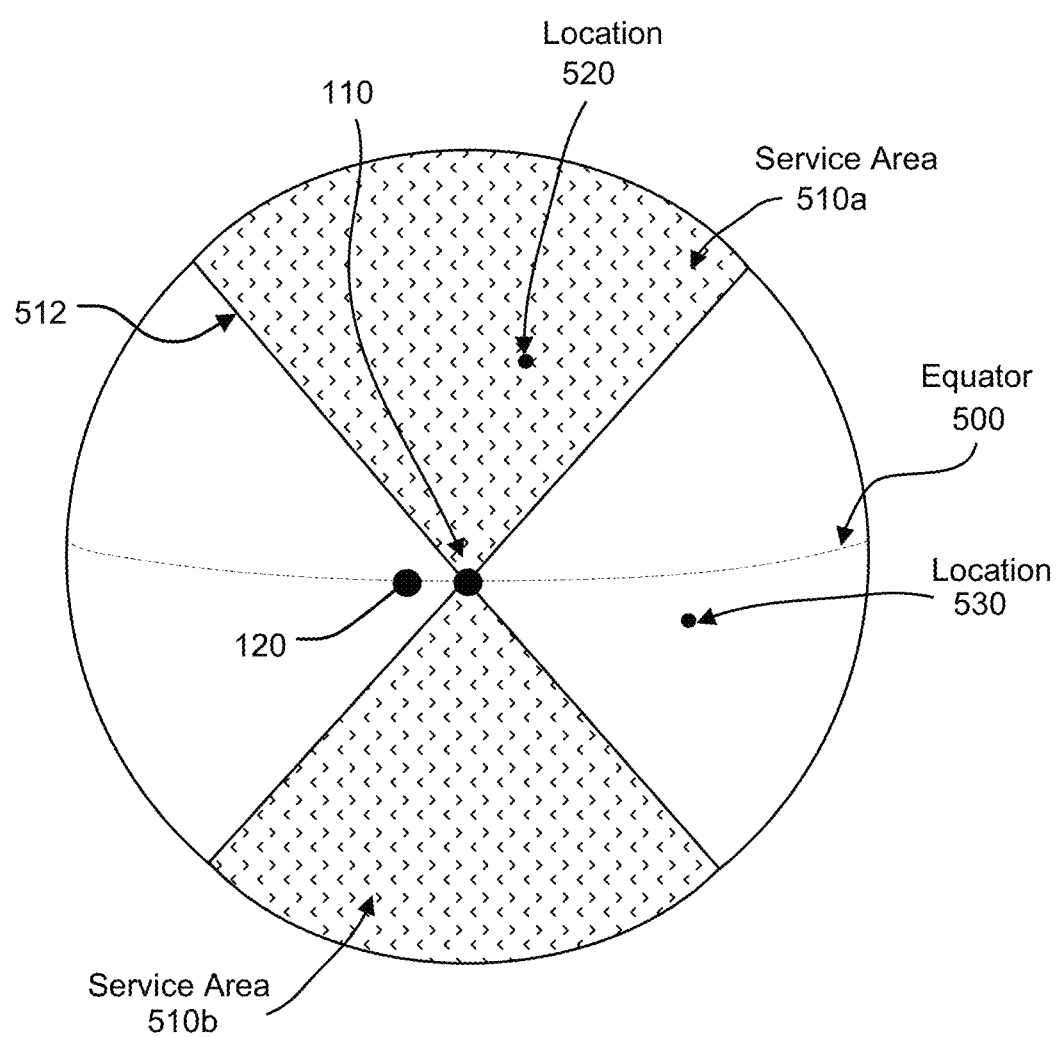
FIG. 5A illustrates an example acceptable service area of the primary antenna.

FIG. 5A illustrates an example acceptable service area 510*a*, 510*b* of the primary antenna 152. In the illustrated embodiment, the target satellite 110 and the non-target satellite 120 are both geostationary satellites.

The acceptable service area 510*a*, 510*b* are geographic locations of the antenna system 150 where the amount of interference with the non-target satellite 120 when using the primary antenna 152 is at or below the threshold, and the signal communication with the target satellite 110 has acceptable or desired performance characteristics. In other words, within the acceptable service area 510*a*, 510*b*, the skew angle of main beam of the primary antenna 152 is less than the maximum acceptable skew angle. The boundary 512 corresponds to the line 490 of FIG. 4B. In the illustrated example, the acceptable service area 510a, 510b account for the attitude of the aircraft 102.

The maximum acceptable skew angle, and thus the acceptable service area 510a, 510b of the primary antenna 152, can vary from embodiment to embodiment. The maximum acceptable skew angle can depend on the radiation pattern of the primary antenna 152, the locations of the target satellite 110 and non-target satellite 120, the threshold amount of interference with the non-target satellite 120, the transmission parameters of the return uplink signal 116, etc.

Figure 5B:
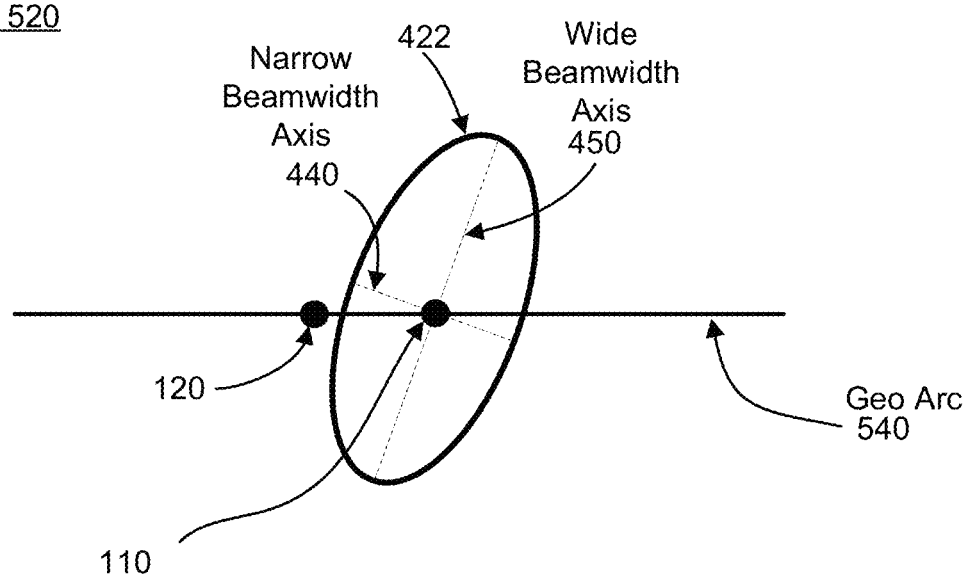
FIG. 5B illustrates the contour of the main beam of the primary antenna for an example geographic location within the acceptable service area.

As described above, the skew angle of the main beam 422 of the primary antenna 512, and thus the composite half-power beamwidth along the geo arc, varies depending upon the geographic location of the antenna system 150. FIG. 5B illustrates the contour of the main beam 422 of the primary antenna 152 for an example geographic location 520 within the acceptable service area 510a, 510b. In this example, the composite half-power beamwidth along the geo arc 540 is small enough that the amount of interference with the non-target satellite 120 is less than or equal to the threshold.

Figure 5C:
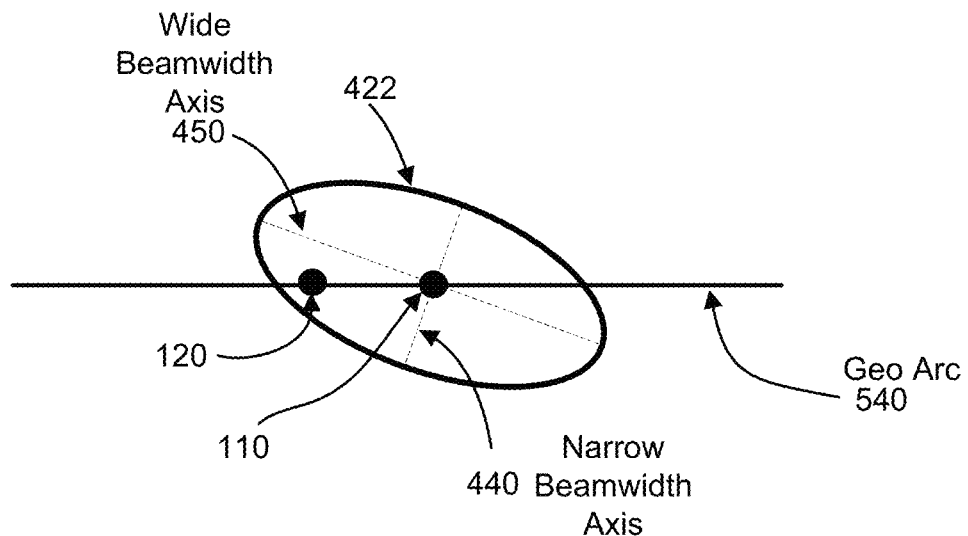
FIG. 5C illustrates the contour of the main beam of the primary antenna for an example geographic location outside the acceptable service area.

FIG. 5C illustrates the contour of the main beam 422 of the primary antenna 152 for an example geographic location 530 outside the acceptable service area 510a, 510b. In this example, the composite half-power beamwidth along the geo arc 540 is large enough to cause excessive interference with the non-target satellite 120, if the primary antenna 152 were used to communication with the target satellite 110.

Figure 5D:
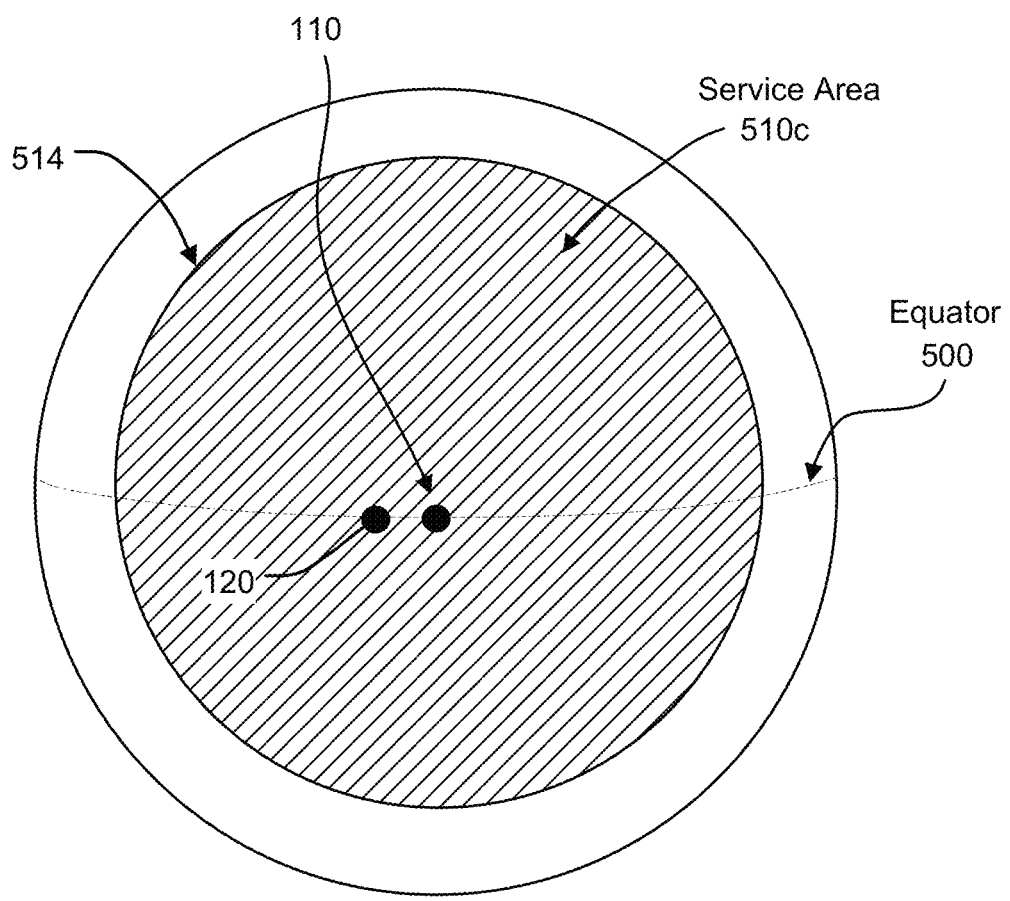
FIG. 5D illustrates an example acceptable service area of the secondary antenna.

FIG. 5D illustrates an example acceptable service area 510c of the secondary antenna 154. The acceptable service area 510c are geographic locations where the amount of interference with the non-target satellite 120 when using the secondary antenna 154 is at or below the threshold, and signal communication with the target satellite 110 has acceptable or desired performance characteristics. In the illustrated embodiment, the acceptable service area 510c is for a secondary antenna 154 that includes a non-movable, fully electronic scanning phased array antenna. At higher latitudes around the same longitude as the target satellite 110, the boundary 514 of the acceptable service area 510c can be due to scan loss of the array which precludes signal communication having acceptable performance characteristics with the target satellite 110. At lower latitudes near the equator 500, the boundary 514 can be due to an increase in the composite half-power beamwidth of the main beam 480 along the geo arc at larger scan angles to the target satellite 110.

As can be seen upon comparison of FIGS. 5A and 5D, in the illustrated embodiment a portion of the acceptable service area 510c of the secondary antenna 514 overlaps with the acceptable service area 510a, 510b of the primary antenna 512. The determination of whether to use the primary antenna 512 or the secondary antenna 514 when the aircraft 102 is at a geographic location within this overlap can vary from embodiment to embodiment. For example, at a given geographic location with this overlap, the antenna selection system 200 can select the primary antenna 152 or secondary antenna 154 based on which antenna 152, 154 provides performance characteristics at the given geographic location for communicating with the target satellite 110. In embodiments in which the primary antenna 152 can provide better performance characteristics than the secondary antenna 154 for communicating with the target satellite 110 when the aircraft 102 is throughout the overlap, the antenna selection system 200 can select the primary antenna 152 for use.

Figure 5E:
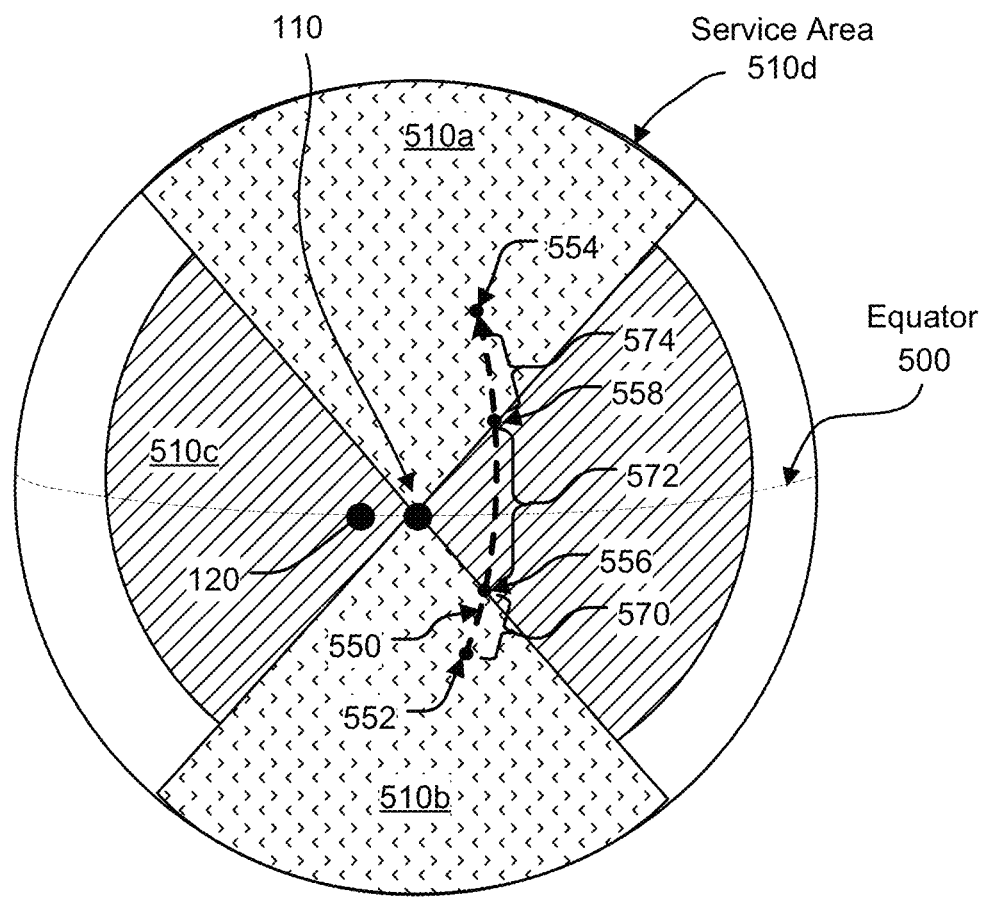
FIG. 5E illustrates an example composite acceptable service area for the antenna system.

FIG. 5E illustrates an example composite acceptable service area 510d for the antenna system 150. The composite acceptable service area 510d are geographic locations where the amount of interference with the non-target satellite 120, when using the primary antenna 152 or the secondary antenna 154, is at or below the threshold, and signal communication with the target satellite 110 has acceptable or desired performance characteristics. The composite acceptable service area 510d is a union of the acceptable service area 510a, 510b of the primary antenna 512 and the acceptable service area 510c of the secondary antenna 514. As can be seen in FIG. 5E, the primary antenna 512 and the secondary antenna 514 provides a larger acceptable service area than a system that includes only one of the antennas 152, 154.

In the illustrated embodiment of FIG. 5E, the primary antenna 152 is selected by the antenna selection system 200 for use within the overlap between the acceptable service area 510a, 510b of the primary antenna 152 and the acceptable service area 510c of the secondary antenna 154. In some alternative embodiments, the antenna selection system 200 may select the secondary antenna 154 for use within some or all of the overlap.

Line 550 represents an example flight path for the aircraft 102 between source 552 and destination 554. At geographic locations along a first segment 570 of the flight path, the aircraft 102 is within the acceptable service area 510b of the primary antenna 152. Thus, along the first segment 570 the antenna selection system 200 selects the primary antenna 152 for communication with the target satellite 110. At geographic location 556 the aircraft 102 leaves the acceptable service area 510b of the primary antenna 152 and enters the acceptable service area 510c of the secondary antenna 154. Thus, at geographic location 556 the antenna selection system 200 switches communication with the target satellite 110 from the primary antenna 152 to the secondary antenna 154, and continues to use the secondary antenna 154 along the segment 572. At geographic location 558 the aircraft 102 enters the acceptable service area 510a of the primary antenna 152. Thus, at geographic location 558 the antenna selection system 200 switches communication with the target satellite 110 from the secondary antenna 154 to the primary antenna 152, and continues to use the primary antenna 152 along the segment 574 to the destination 554.

In the illustrated embodiment the antenna selection system 200 switches communication between the primary antenna 152 and the secondary antenna 514 at the boundaries between the various acceptable service areas. In other embodiments, the switching along the flight path may occur at geographic locations different than these boundaries. For example, if at least a portion of the segment 574 adjacent geographic location 558 is within the overlap of the acceptable service areas 510a, 510c, the antenna selection system 200 may continue to use the secondary antenna 154 for some or all of that portion. In contrast, if the flight path were in the other direction, the antenna selection system 200 switches from the primary antenna 152 to the secondary antenna 154 at geographic location 558, since a portion of the segment 572 adjacent the geographic location 558 is not within the overlap of the acceptable service areas of the primary antenna 152 and the secondary antenna 154. In other words, the geographic locations at which the antenna selection system 200 switches between the primary antenna 152 and the secondary antenna 154 may depend on whether the aircraft 102 is moving from the acceptable service area 510a, 510b of the primary antenna 152 to the acceptable service area 510c of the secondary antenna 154, or is moving from the acceptable service area 510c of the secondary antenna 154 to the acceptable service area 510a, 510b of the primary antenna 152.

Figure 6:
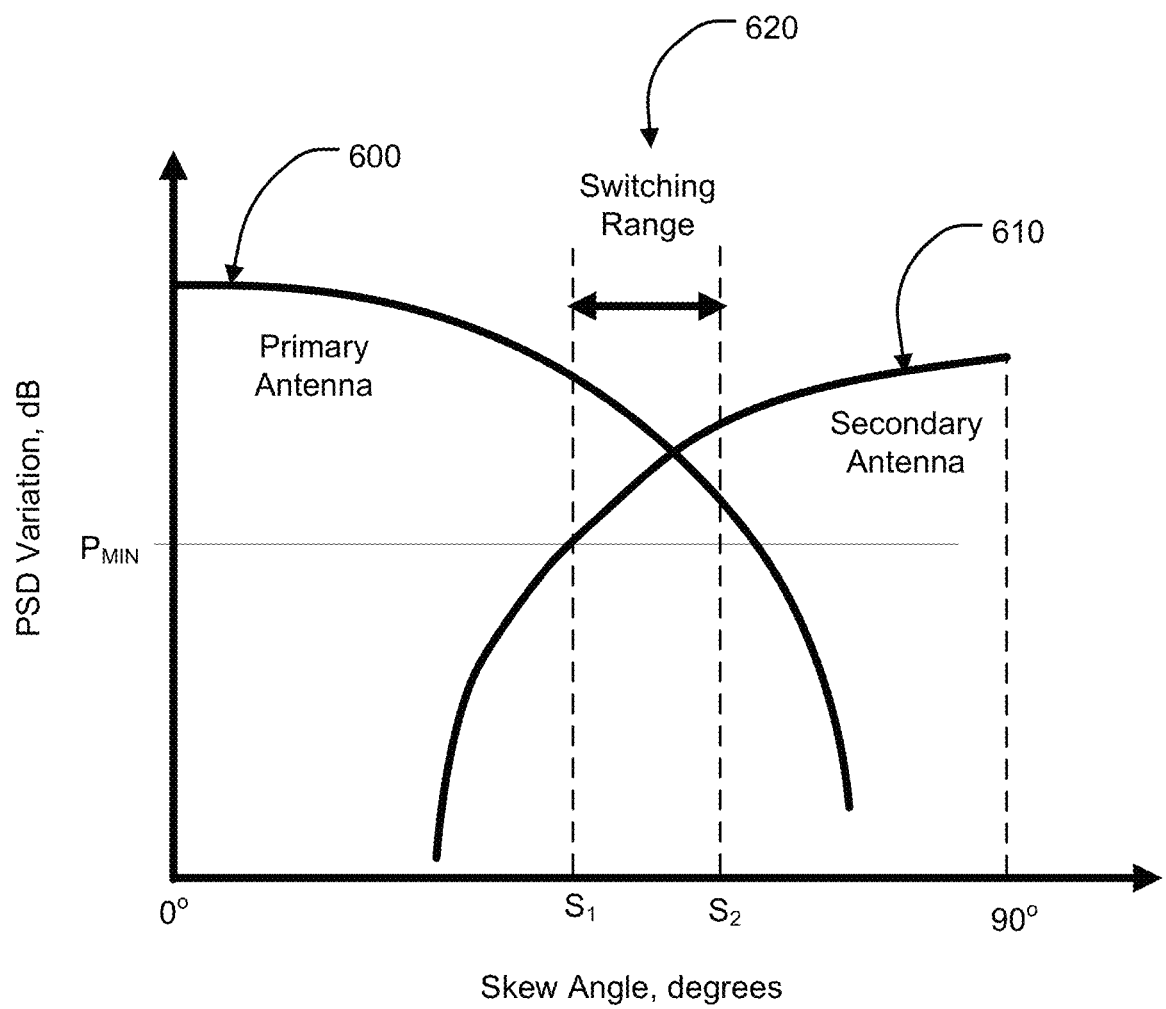
FIG. 6 is an example graph of maximum power spectral density (PSD) curves for the primary antenna and the secondary antenna that satisfy interference requirements with the non-target satellite.

FIG. 6 is an example graph of maximum power spectral density (PSD) curves for the primary antenna 512 and the secondary antenna 514 that satisfy interference requirements with the non-target satellite 120. As can be seen in the graph, the curve 600 of the maximum PSD for the primary antenna 512 decreases with increasing skew angle. This is due to the increase in the composite beamwidth of the main beam 422 of the primary antenna 512 as the skew angle increases. In contrast, the curve 610 of the maximum PSD for the secondary antenna 514 increases as the skew angle of the main beam 422 of the primary antenna 512 approaches 90 degrees. This is due to the increasing projected aperture of the secondary antenna 154 along the line defined by the target satellite 110 and the non-target satellite 120. In other words, the composite half-power beamwidth of the secondary antenna decreases as the skew angle of the primary antenna increases.

In the illustrated embodiment of FIG. 6, the switching by the antenna selection system 200 between the primary antenna 152 and the secondary antenna 154 occurs over a non-zero switching range 620 between skew angle $S_1$ and skew angle $S_2$. The switching range 620 corresponds to at least a portion of the overlap between the acceptable service areas of the primary antenna 152 and the secondary antenna 154. The switching by the antenna selection system 200 from the primary antenna 152 to the secondary antenna 154 occurs at skew angle $S_2$, whereas the switching from the secondary antenna 154 to the primary antenna 152 occurs at skew angle $S_1$. The skew angle $S_2$ may for example correspond to geographic locations (e.g. geographic location 556) along the boundary of the acceptable service area 510a, 510b of the primary antenna 152. The skew angle $S_1$ can correspond to geographic locations within the overlap and inside the boundary of the acceptable service area 510a, 510b of the primary antenna 152. By having separate skew angle values $S_1$, $S_2$, rapid switching can be avoided when the aircraft 102 flies near the boundaries of the acceptable service area 510a, 510b of the primary antenna 152 and the acceptable service area 510c of the secondary antenna 154. In alternative embodiments, the skew angle S1 and skew angle S2 may be the same.

As can be seen in FIG. 6, the minimum PSD $P_{min}$ over the range of skew angles from 0 to 90 degrees that the antenna system 150 can provide by switching between the primary antenna 152 and the secondary antenna 154 is significantly greater than can be provided by either antenna 152, 154 separately.

Figure 7:
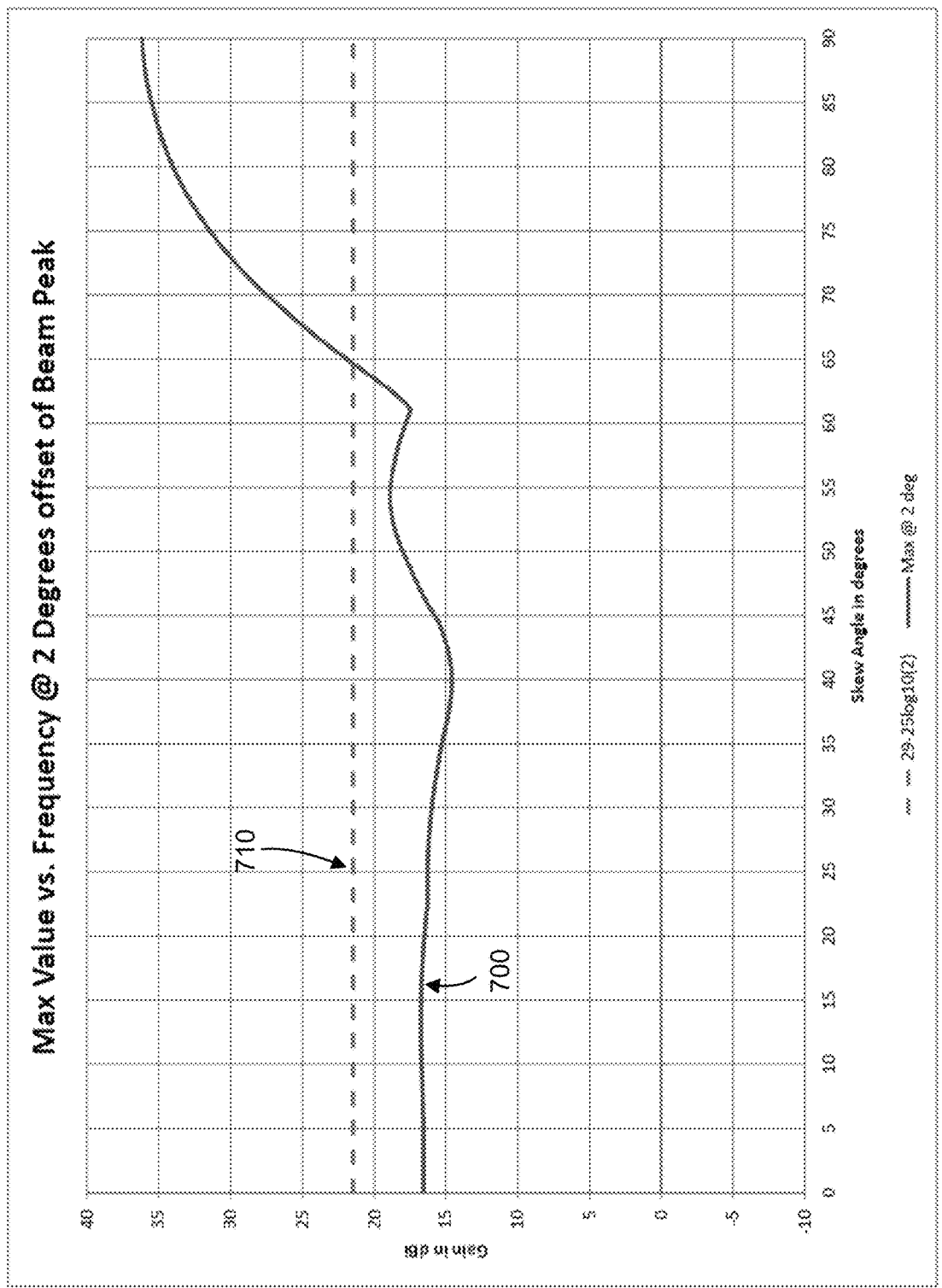
FIG. 7 is an example plot of the maximum value of the gain of the primary antenna at 2 degrees from boresight of the main beam versus skew angle.

FIG. 7 is an example plot 700 of the maximum value of the gain of the primary antenna 152 at 2 degrees from boresight of the main beam versus skew angle. Line 710 represents the maximum value of the gain that satisfies interference requirements with the non-target satellite 120. As can be seen in FIG. 7, the plot 700 crosses the line 710 at a skew angle value of about 65 degrees in this example. Thus, in this example the maximum acceptable skew angle for the primary antenna 152 is about 65 degrees.

Figure 8:
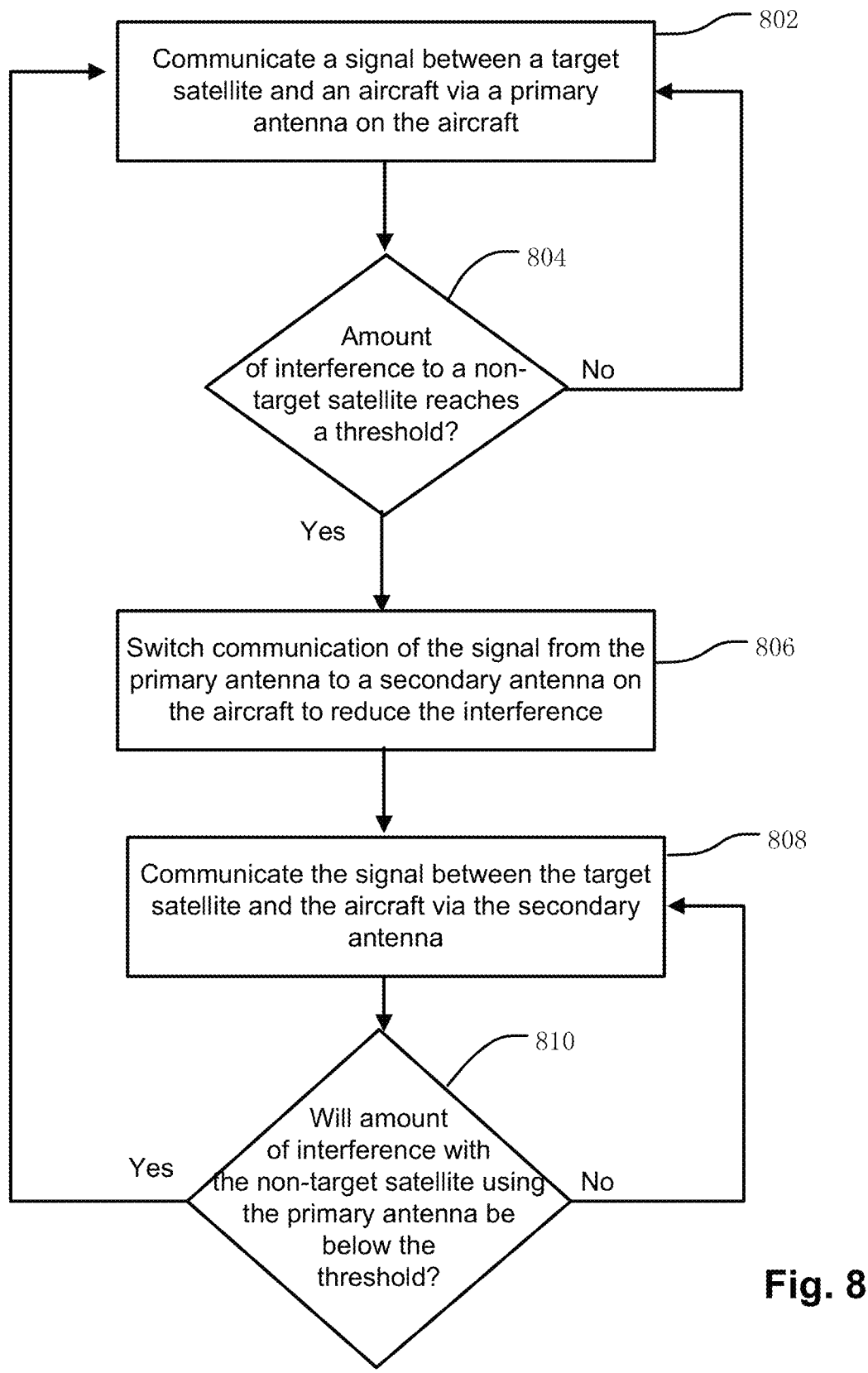
FIG. 8 illustrates an example process for switching between the primary antenna and the secondary antenna.

FIG. 8 illustrates an example process 800 for switching between the primary antenna 512 and the secondary antenna 514. Other embodiments can combine some of the steps, can perform the steps in different orders and/or perform different or additional steps to the ones illustrated in FIG. 8. In the illustrated embodiment, the process 800 includes steps performed by the antenna selection system 200 discussed above.

At step 802, a signal is communicated between a target satellite and an aircraft via a primary antenna on the aircraft. In the illustrated embodiment, the primary antenna is mechanically steerable and has an asymmetric antenna beam pattern with a narrow beamwidth axis and a wide beamwidth axis at boresight. The primary antenna can for example be the primary antenna 152 discussed above.

At step 804, the determination of whether an amount of interference with a non-target satellite reaches a threshold due to the wide beamwidth axis of the asymmetric antenna beam pattern. If not, the process 500 returns to step 802.

If the determination is made at step 804 that the amount of interference with the non-target satellite reaches the threshold, the process continues to step 806. At step 806, communication of the signal is switched from the primary antenna to a secondary antenna on the aircraft to reduce interference. The secondary antenna can for example be the secondary antenna 154 discussed above.

At step 808, the signal is communicated between the target satellite and the aircraft via the secondary antenna.

At step 810, the determination of whether an amount of interference with the non-target satellite using primary antenna will be below the threshold. The step 810 can for example be performed as the aircraft 102 moves. If not, process returns to step 808.

If the determination is made at step 810 that the amount of interference with the non-target satellite using the primary antenna will be below the threshold, the process returns to step 802.

While the present disclosure is described by reference to the examples detailed above, it is to be understood that these examples are intended in an illustrative rather than in a limiting sense. It is contemplated that modifications and combinations will readily occur to those skilled in the art, which modifications and combinations will be within the spirit of the disclosure and the scope of the following claims.

What is claimed is:

1. An antenna system for mounting on an aircraft, the antenna system comprising:
   a primary antenna on the aircraft, wherein the primary antenna has a first acceptable service area for transmission of an uplink signal from the aircraft to a target satellite while satisfying an uplink interference requirement with a non-target satellite;
   a secondary antenna on the aircraft, wherein the secondary antenna has a second acceptable service area for transmission of the uplink signal from the aircraft to the target satellite while satisfying the uplink interference requirement with the non-target satellite, and wherein the second acceptable service area is different than the first acceptable service area; and
   an antenna selection system to control communication of the uplink signal from the aircraft to the target satellite via the primary antenna and the secondary antenna, wherein the antenna selection system switches transmission of the uplink signal between the primary antenna and the secondary antenna based on a geographic location of the aircraft and the first and second acceptable service areas.

2. The antenna system of claim 1, wherein the antenna selection system selects the primary antenna to transmit the uplink signal when the geographic location of the aircraft is within the first acceptable service area, and the antenna selection system selects the secondary antenna to transmit the uplink signal when the geographic location of the aircraft is outside the first acceptable service area and is within the second acceptable service area.

3. The antenna system of claim 1, wherein the first acceptable service area and the second acceptable service area define a composite acceptable service area of the antenna system, the composite acceptable service area larger than each of the first acceptable service area and the second acceptable service area.

4. The antenna system of claim 1, wherein the antenna selection system further selectively changes one or more transmission parameters of the uplink signal.

5. The antenna system of claim 4, wherein the antenna selection system selectively changes the one or more transmission parameters of the uplink signal to adjust power spectral density of the uplink signal in a direction of the non-target satellite.

6. The antenna system of claim 4, wherein the one or more transmission parameters includes one or more of a power level of the uplink signal and a bandwidth spreading of the uplink signal.

7. The antenna system of claim 1, wherein the first acceptable service area and the second acceptable service area have an overlap.

8. The antenna system of claim 7, wherein the antenna selection system selects the primary antenna to transmit the uplink signal when the geographic location of the aircraft is within the overlap.

9. The antenna system of claim 7, wherein the antenna selection system switches transmission of the uplink signal between the primary antenna and the secondary antenna when the geographic location of the aircraft is moving from the overlap to one of the first acceptable service area and the second acceptable service area.

10. The antenna system of claim 9, wherein the antenna selection system only switches transmission of the uplink signal between the primary antenna and the secondary antenna when the geographic location of the aircraft is moving from the overlap to one of the first acceptable service area and the second acceptable service area.

11. The antenna system of claim 1, wherein the antenna selection system switches transmission of the uplink signal between the primary antenna and the secondary antenna at boundaries of the first and second acceptable service areas.

12. The antenna system of claim 11, wherein the antenna selection system selects the primary antenna to transmit the uplink signal when the geographic location of the aircraft is within the first acceptable service area.

13. The antenna system of claim 1, wherein the antenna selection system further controls communication of a downlink signal from the target satellite to the aircraft via the primary antenna and the secondary antenna.

14. The antenna system of claim 13, wherein the antenna selection system switches reception of the downlink signal between the primary antenna and the secondary antenna upon switching transmission of the uplink signal between the primary antenna and the secondary antenna.

15. The antenna system of claim 13, wherein the antenna selection system maintains reception of the downlink signal via the primary antenna upon switching transmission of the uplink signal to the secondary antenna.

16. The antenna system of claim 1, wherein the antenna selection system maintains a return link operating point of the uplink signal upon switching transmission of the uplink signal between the primary antenna and the secondary antenna.

17. The antenna system of claim 16, wherein the antenna selection system maintains the return link operating point of the uplink signal by changing transmit power of the uplink signal.

18. The antenna system of claim 1, wherein the primary antenna has at least one performance characteristic for communicating the uplink signal that is different than that of the secondary antenna.

19. The antenna system of claim 18, wherein the primary antenna has at least one of higher gain, lower sidelobes and lower cross-polarization than that of the secondary antenna.

20. The antenna system of claim 1, wherein differences between the first and second acceptable service areas are due to differences between the primary antenna and the secondary antenna.

* * * * *